(12) United States Patent
Yamada et al.

(10) Patent No.: US 9,762,152 B2
(45) Date of Patent: Sep. 12, 2017

(54) MOTOR CONTROL SYSTEM FOR EXECUTING DRIVE CONTROL OF AN ALTERNATING-CURRENT MOTOR

(75) Inventors: Kenji Yamada, Komaki (JP); Yasuhiro Nakai, Kariya (JP)

(73) Assignees: TOYOTA JIDOSHA KABUSHIKI KAISHA, Toyota-shi (JP); DENSO CORPORATION, Kariya-shi (JP)

( * ) Notice: Subject to any disclaimer, the term of this patent is extended or adjusted under 35 U.S.C. 154(b) by 412 days.

(21) Appl. No.: 14/342,611

(22) PCT Filed: Sep. 5, 2012

(86) PCT No.: PCT/IB2012/001708
§ 371 (c)(1),
(2), (4) Date: Mar. 4, 2014

(87) PCT Pub. No.: WO2013/034965
PCT Pub. Date: Mar. 14, 2013

(65) Prior Publication Data
US 2014/0225536 A1  Aug. 14, 2014

(30) Foreign Application Priority Data
Sep. 6, 2011 (JP) .................................. 2011-193682

(51) Int. Cl.
*H02P 1/54* (2006.01)
*H02P 5/00* (2016.01)
(Continued)

(52) U.S. Cl.
CPC ................ *H02P 6/04* (2013.01); *B60L 15/02* (2013.01); *H02P 21/22* (2016.02); *H02P 23/009* (2013.01);
(Continued)

(58) Field of Classification Search
CPC  H02P 5/68; A63H 19/24; B64C 13/24; Y02T 10/646; B23C 3/16
(Continued)

(56) References Cited

U.S. PATENT DOCUMENTS 7,653,466 B2 * 1/2010 Egami ...................... B60K 6/26
318/139
2007/0290633 A1 * 12/2007 Atarashi ............... B60L 3/0023
318/66

(Continued)

FOREIGN PATENT DOCUMENTS

EP      2023482 A1   2/2009
JP      03235688 A   10/1991
(Continued)

*Primary Examiner* — Kawing Chan
*Assistant Examiner* — Bradley Brown
(74) *Attorney, Agent, or Firm* — Andrews Kurth Kenyon LLP

(57) ABSTRACT

A motor control system includes: a converter; two inverters; two alternating-current motors; and a control unit. The control unit is configured to control the system voltage by feedback of a current phase of a current vector of motor current of each of the motors on a d-q coordinate plane so that rectangular wave control of at least one of the first and second motors is performed in a state where the current phase is an optimal current phase, wherein the control unit selects, as a subject of the feedback, the current phase of one of the motors that is larger than the other motor in system voltage deviation obtained based on the current vector.

11 Claims, 13 Drawing Sheets

(51) Int. Cl.
- *H02P 5/46* (2006.01)
- *H02P 6/04* (2016.01)
- *B60L 15/02* (2006.01)
- *H02P 27/06* (2006.01)
- *H02P 23/00* (2016.01)
- *H02P 21/22* (2016.01)
- *H02P 5/68* (2006.01)

(52) U.S. Cl.
CPC ............... *H02P 27/06* (2013.01); *H02P 5/68* (2013.01); *H02P 2006/045* (2013.01); *H02P 2201/09* (2013.01); *Y02T 10/644* (2013.01); *Y02T 10/645* (2013.01); *Y02T 10/648* (2013.01)

(58) Field of Classification Search
USPC .............................................. 318/51, 400.02
See application file for complete search history.

(56) References Cited

U.S. PATENT DOCUMENTS

| | | | |
|---|---|---|---|
| 2009/0230901 A1* | 9/2009 | Amano | B60L 11/14 318/400.3 |
| 2009/0278483 A1 | 11/2009 | Egami et al. | |
| 2010/0176757 A1* | 7/2010 | Yamakawa | H02M 7/53873 318/400.09 |
| 2011/0248663 A1 | 10/2011 | Yamakawa | |

FOREIGN PATENT DOCUMENTS

| | | |
|---|---|---|
| JP | 2006121855 A | 5/2006 |
| JP | 2006-311768 A | 11/2006 |
| JP | 2007-202311 A | 8/2007 |
| JP | 2007-202383 A | 8/2007 |
| JP | 2007-202384 A | 8/2007 |
| JP | 2007-325397 A | 12/2007 |
| JP | 2009273286 A | 11/2009 |
| JP | 2010148331 A | 7/2010 |

* cited by examiner

MOTOR CONTROL SYSTEM FOR EXECUTING DRIVE CONTROL OF AN ALTERNATING-CURRENT MOTOR

CROSS REFERENCE TO RELATED APPLICATION

This is a national phase application based on the PCT International Patent Application No. PCT/IB2012/001708 filed on Sep. 5, 2012, claiming priority to Japanese application No. 2011-193682 filed Sep. 6, 2011, the entire contents of both of which are incorporated herein by reference.

BACKGROUND OF THE INVENTION

1. Field of the Invention

The invention relates to a motor control system and, more particularly, to a motor, control system that executes drive control of an alternating-current motor by applying alternating-current voltage converted by an inverter from direct-current voltage stepped up by a converter.

2. Description of Related Art

In a related art, there is known an electric vehicle that includes an electric motor as a driving power source. The electric motor is driven by electric power from a battery to output power. A three-phase synchronous alternating-current motor may be used as the electric motor. The three-phase synchronous alternating-current motor is driven by the application of three-phase alternating-current voltage converted by an inverter from direct-current voltage supplied from a power supply.

In addition, in some electric vehicles as described above, the direct-current voltage supplied from the battery is not directly supplied to the inverter but is stepped up by a buck-boost converter to a predetermined command value and then input to the inverter. it is advantageous to step up a system voltage VH with the use of the buck-boost converter to increase the system voltage VH in this way because it is possible to drive the alternating-current motor at higher torque and higher rotation speed.

Sinusoidal pulse width modulation (PWM) control, overmodulation control and rectangular wave control are known as a control method for the three-phase alternating-current motor. These control methods are selectively switched and used on the basis of a driving condition of a vehicle, a modulation factor (described later), and the like, widely.

For example, Japanese Patent Application Publication No. 2006-311768 (JP 2006-311768 A) describes that, in a motor control system that is able to variably control an input voltage to an inverter, keeps a modulation factor in a predetermined control method at a target value. In the motor control system, the inverter (14) converts a system voltage (VH) into, alternating-current voltage and applies the system voltage (VH) to an alternating-current motor (M1) in accordance with torque control executed by a PWM control block (200). A modulation factor target value setting unit (310) sets a modulation factor, by which a loss in a whole system is reduced, as a modulation factor target value (Kmd#) in the predetermined control method in the inverter (14) of which the modulation factor is not fixed. A modulation factor computing unit (330) computes the ratio of the amplitude (Vamp) of a motor required voltage to the input voltage to the inverter (14), that is, the system voltage (VH), to obtain an actual modulation factor (Kmd). A voltage command value generating unit (340) generates a voltage command value (VH#) of the system voltage (VH) on the basis of a comparison between the actual modulation factor (Kmd) and the modulation factor target value (Kmd#). A converter (12) variably controls the system voltage (VH) on the basis of the voltage command value (VH#).

As in the case of the motor control system described in JP 2006-311768 A, in a motor control system that includes a converter, an inverter and an alternating-current motor, it is advantageous to decrease a voltage stepped up by the converter to operate the alternating-current motor in rectangular wave control, that is, so-called single-pulse control, in order to reduce a switching loss in the converter and the inverter. However, because rectangular wave control is voltage phase control under field-weakening control, a motor loss increases as a field-weakening current increases: On the other hand, when a voltage stepped up by the converter is increased to operate the alternating-current motor in sinusoidal PWM control, a motor loss is reduced. However, due to a switching, loss resulting from an increase in the number of switching operations, a loss in the converter and the inverter increases. Thus, a loss of the whole system that includes the alternating-current motor is minimized when the current vector of motor current is on an optimal current advance line at which maximum torque is output or near the optimal current advance line during rectangular wave control.

When the operation of the alternating-current motor is controlled in a rectangular wave control mode in which the current phase of motor current is on the optimal current advance line or near the optimal current advance line in this way, a modulation factor in rectangular wave control is constant (for example, 0.78) and therefore, it is not possible to variably control the system voltage while setting a modulation factor as a target as described in JP 2006-311768 A.

In addition, when the above-described system voltage variable control is applied to a system in which a plurality of alternating-current motors are connected to a single converter via respective inverters in parallel with each other, the rotation speeds and command torques of the respective, motors are usually different from each other and therefore, system voltages at which losses of the respective motors are minimum are generally different from each other. Therefore, in the system that variably controls the system voltage so that the current vectors of motor currents flowing through the alternating-current motors and modulation factors are fed back to minimize a loss, it is necessary to select any one of the motors and execute feedback control such that a loss of the selected one of the motors is minimized.

However, in the case where feedback loops of the current vectors, or the like, are respectively provided in correspondence with the individual motors, when the motor and a feedback control deviation are not appropriately selected, the plurality of feedback controls interfere with each other and as a result, variable control of the system voltage may be unstable or the system voltage may become stepwise, which hinders smooth variable control.

SUMMARY OF THE INVENTION

The invention enables, in a motor control system that drives a plurality of motors with the use of a voltage output from a single converter, stable and smooth variable control of a system voltage by preventing interference between feedback controls executed in correspondence with the motors.

A motor control system according to a first aspect of the invention includes: a converter that is configured to be able to step up a direct-current voltage, supplied from a power supply, in accordance with a system voltage command value; first and second inverters, each of which is configured to convert a direct-current voltage, which is a system voltage output from the converter, to an alternating-current voltage; first and second motors that are driven by the alternating-current voltages respectively applied from the first and second inverters; and a control unit that is configured to be able to drive the first and second motors in any one of control methods of sinusoidal PWM control, overmodulation control and rectangular wave control by executing operation control of the converter and the first and second inverters according to an input or generated torque command value, wherein the control unit is configured to control the system voltage by feedback of a current phase of a current vector of motor current of each of the first and second motors on a d-q coordinate plane so that the rectangular wave control of at least one of the first and second motors is performed in a state where the current phase is an optimal current phase, wherein the control unit selects, as a subject of the feedback, the current phase of one of the first and second motors that is larger than the other motor in system voltage deviation obtained based on the current vector.

In the motor control system according to the first aspect of the invention, the control unit may be configured to compare first and second required system voltage values respectively required by the first and second motors to select one of the first and second required system voltage values as a system voltage command base value and add a system voltage correction value, obtained through the feedback of the current phase, to the system voltage command base value to generate the system voltage command value.

In the motor control system according to the first aspect of the invention, the control unit may store a first map and a second map that each define correlations among motor rotation speed, torque, and required system voltage values for the first and second motors, respectively; the control unit may be configured to refer to the first map to obtain a first required system voltage value on the basis of a torque command value, and a rotation speed for the first motor; and the control unit may be configured to refer to the second map to obtain a second required system voltage value on the basis of a torque command value and a rotation speed for the second motor.

In the motor control system according to the first aspect of the invention, the control unit may be configured to compare the first and second required system voltage values to select one of the first and second required system voltage values as a system voltage command base value and add a system voltage correction value obtained through the feedback of the current phase, to the system voltage command base value to generate the system voltage command value.

In the motor control system according to the first aspect of the invention, the control unit may be configured to select one of the first and second required system voltage values that is larger than the other of the first and second required system voltage values, as the system voltage command base value.

A motor control system according to a second aspect of the invention includes: a converter that is configured to be able to step up a direct-current voltage, supplied from a power supply, in accordance with a system voltage command value; first and second inverters, each of which is configured to convert a direct-current voltage, which is a system voltage output from the converter, to an alternating-current voltage; first and second motors that are driven by the alternating-current voltages respectively applied from the first and second inverters; and a control unit that is configured to be able to drive the first and second motors in any one of control methods of sinusoidal PWM control, overmodulation control and rectangular wave control by executing operation control of the converter and the first and second inverters according to an input or generated torque command value, wherein the control unit is configured to control the system voltage by feedback of a voltage phase of each of first and second motor voltages respectively applied to the first and second motors so that the rectangular wave control of at least one of the first and second motors is performed in a state where a current vector of motor current on a d-q coordinate plane is an optimal current phase, wherein the control unit selects, as a subject of the feedback, the voltage phase of one of the first and second motors that is larger than the other motor in system voltage deviation obtained based on the current vector.

In the motor control system according to the second aspect of the invention, the control unit may be configured to compare first and second required system voltage values respectively required by the first and second motors to select one of the first and second required system voltage values as a system voltage command base value and add a system voltage correction value obtained through the feedback of the voltage phase, to the system voltage command base value to generate the system voltage command value.

In the motor control system according to the second aspect of the invention, the control unit may store a first map and a second map that each define correlations among motor rotation speed, torque, and required system voltage values for the first and second motors, respectively; the control unit may be configured to refer to the first map to obtain a first required system voltage value on the basis of a torque command value, and a rotation speed for the first motor; and the control unit may be configured to refer to the second map to obtain a second required system voltage value on the basis of a torque command value and a rotation speed for the second motor In the motor control system according to the second aspect of the invention, the control unit may be configured to compare the first and second required system voltage values to select one of the first and second required system voltage values as a system voltage command base value and add a system voltage correction value obtained through the feedback of the voltage phase, to the system voltage command base value to generate the system voltage command value.

In the motor control system according to the second aspect of the invention, the control unit may be configured to select one of the first and second required system voltage values that is larger than the other of the first and second required system voltage values, as the system voltage command base value.

With the motor control system according to the invention, feedback controls corresponding to the individual alternating-current motors do not interfere with each other, and variable control of the system voltage does not become unstable, and it is possible to execute smooth variable control of the system voltage.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments according to the invention (hereinafter, embodiments) will be described in detail with reference to the accompanying drawings. In the description, shapes, materials, numeric values, directions, and the like, are illustrative for the sake of easy understanding of the invention, and may be modified as needed in accordance with an application, a purpose, specifications, and the like. In addition, when a plurality of embodiments, alternative embodiments, and the like, are included in the following description, it is originally assumed to use characterizing portions of them in combination where appropriate.

Figure 1:
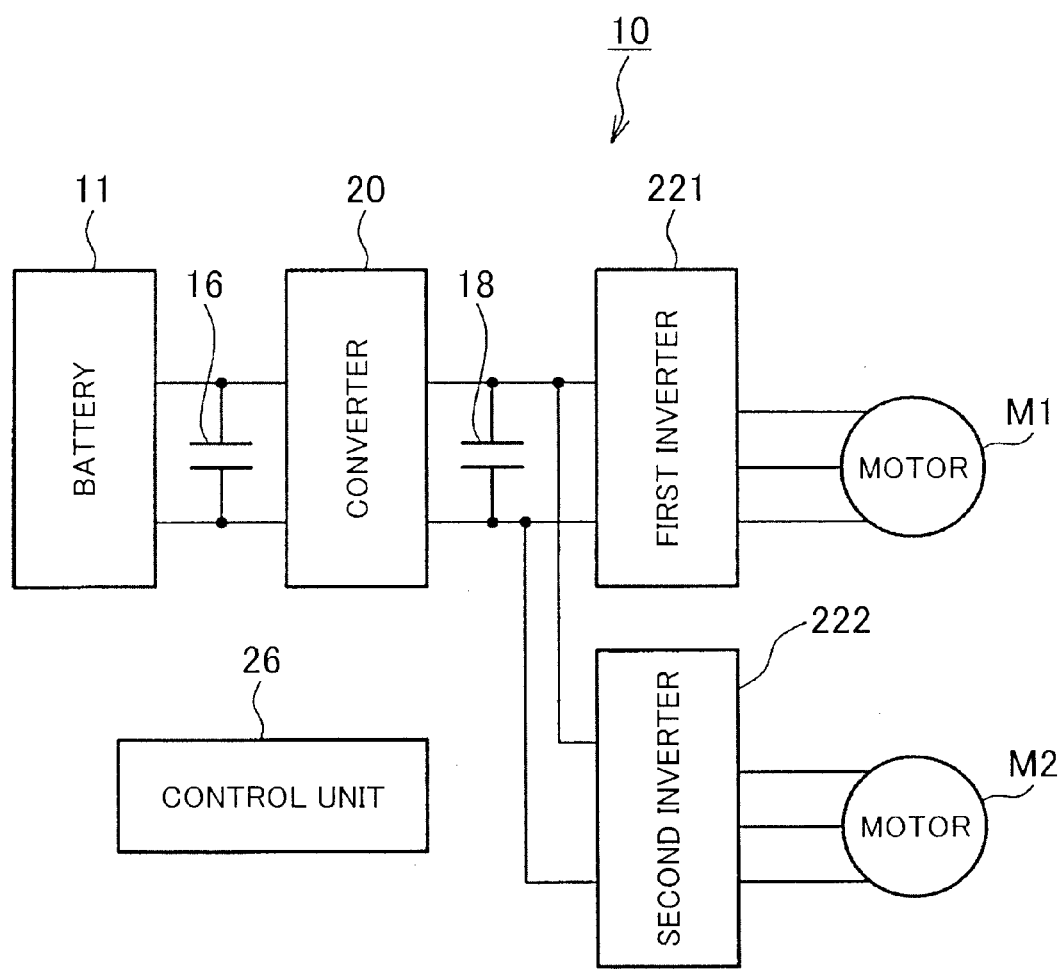
FIG. 1 is a diagram that schematically shows an overall configuration of a motor control system.

FIG. 1 is a diagram that shows an overall configuration of a motor control system 10 according to an embodiment. The motor control system 10 may be suitably used in a hybrid vehicle, an electric vehicle, or the like, on which an electric motor is mounted as a driving power source.

The motor control system 10 includes a battery 11, a converter 20, inverters 221 and 222 (first and second inverters), alternating-current motors M1 and M2 (first and second alternating-current motors) and a control unit 26. The battery 11 serves as a direct-current power supply. The converter 20 is connected to the battery 11. The inverters 221 and 222 are connected to the converter 20 in parallel with each other. The alternating-current motors. M1 and M2 are respectively connected to the inverters 221 and 222. The control unit 26 controls operations of the converter 20 and inverters 221 and 222.

A smoothing capacitor 16 is connected between the battery 11 and the converter 20. In addition, a smoothing capacitor 18 is connected between the converter 20 and the inverters 221 and 222.

Figure 2:
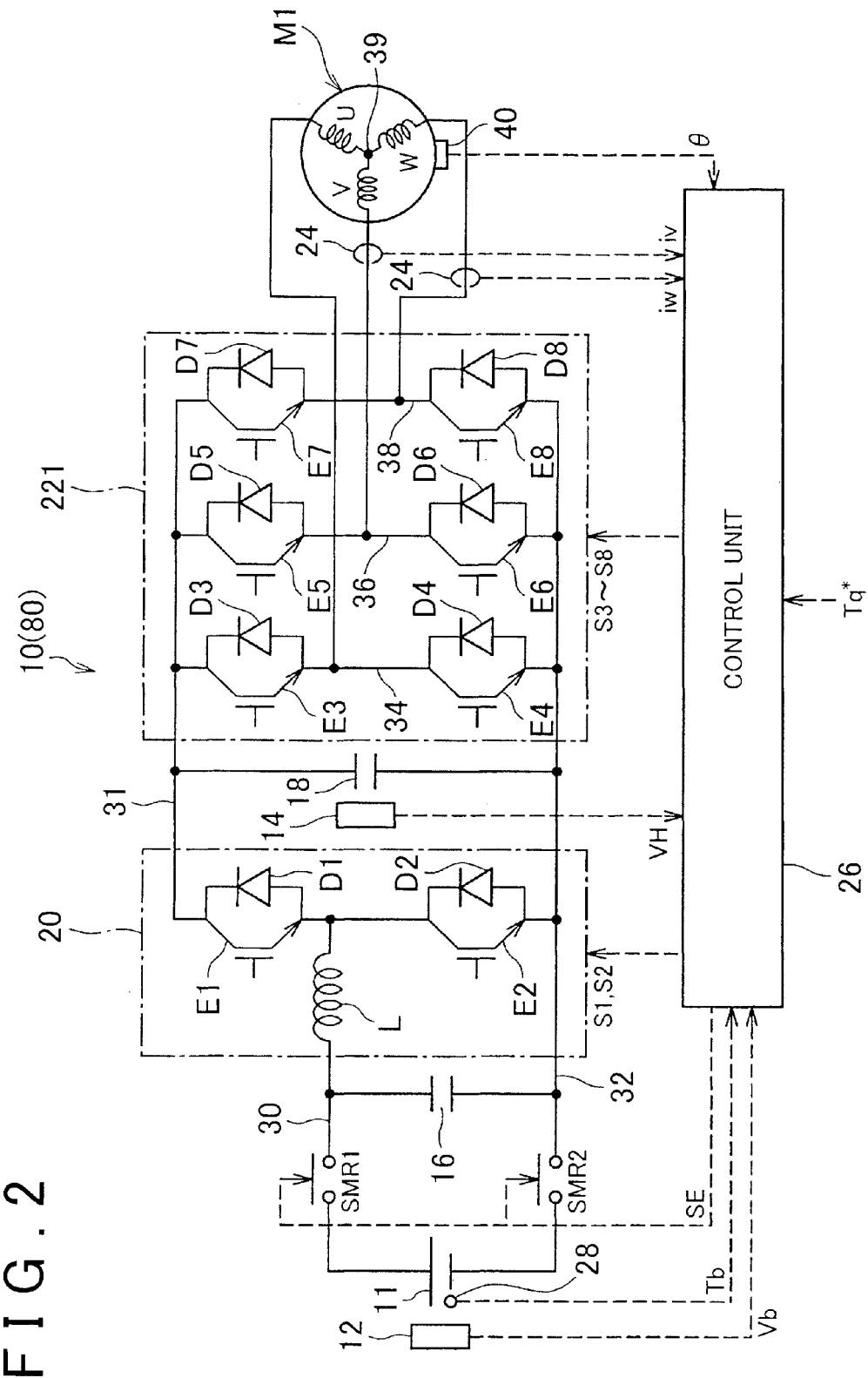
FIG. 2 is a diagram that shows a converter, one of inverters and one of alternating-current motors in the motor control system in detail.

FIG. 2 is a diagram that shows the converter 20, the inverter 221 and the alternating-current motor M1 in the motor control system 10 in detail. In FIG. 2 (similarly in FIG. 7 and FIG. 12), for the sake of simplification, the inverter 222 and the alternating-current motor M2 are not shown. The configurations, operations, controls, and the like, of the inverter 222 and alternating-current motor M2 are similar to the configurations, and the like, of the inverter 221 and alternating-current motor M1 that will be described with reference to FIG. 2 to FIG. 10.

As shown in FIG. 2, the alternating-current motor M1 is a driving electric motor to generate torque for driving drive wheels of, for example, a hybrid vehicle or an electric vehicle. Alternatively, the alternating-current motor M1 may be configured to have the function of a generator that is driven by an engine or may be configured to have both the function of an electric motor and the function of a generator. Furthermore, the alternating-current motor M1 may be incorporated in a hybrid vehicle such that the alternating-current motor M1 operates as an electric motor to, for example, be able to start an engine.

The battery 11 includes a secondary battery, such as a nickel metal hydride battery and a lithium ion battery. Alternatively, other than the secondary battery, a capacitor with no chemical reaction or a fuel cell may be used as a power supply device. A voltage sensor 12 detects a direct-current voltage or battery voltage Vb output from the battery 11, and outputs the detected direct-current voltage Vb to the control unit 26. A temperature sensor 28 is provided on the battery 11. A battery temperature Tb detected by the temperature sensor 28 is output to the control unit 26.

A system main relay SMR1 is provided on a power line 30 that is connected to the positive electrode terminal of the battery 11. In addition, a system main relay SMR2 is provided on a ground line 32 that is connected to the negative electrode terminal of the battery 11. The system main relays SMR1 and SMR2 are turned on or off by a signal SE from the control unit 26. More specifically, the system main relays SMR1 and SMR2 are turned on by an H (logical high) level signal SE from the control unit 26, and are turned off by an L (logical low) level signal SE from the control unit 26.

The converter 20 includes a reactor L, power semiconductor switching elements E1 and E2 and diodes D1 and D2. The power semiconductor switching elements E1 and E2 are connected in series with each other between the power line 31 and the ground line 32. On/off states of the power semiconductor switching elements E1 and E2 are respectively controlled by switching control signals S1 and S2 from the control unit 26.

An insulated gate bipolar transistor (IGBT), or the like, may be suitably used as each power semiconductor switching element (hereinafter, simply referred to as "switching element"). Antiparallel diodes D1 and D2 are respectively arranged for the switching elements E1 and E2.

The reactor L is connected between the power line 30 and a connection node of the switching elements E1 and E2. In addition, the smoothing capacitor 16 is connected between the power line 30 and the ground line 32. The smoothing capacitor 16 has the function of smoothing the battery voltage Vb and supplying the smoothed battery voltage Vb to the inverter 221.

The inverter 221 includes a U-phase arm 34, a V-phase arm 36 and a W-phase arm 38 that are provided in parallel with one another between the power line 31 and the ground line 32. Each of the phase arms 34 to 38 includes switching elements that are connected in series with each other between the positive electrode-side power line 31 and the ground line 32. For example, the U-phase arm 34 includes switching elements E3 and E4, the V-phase arm 36 includes switching elements E5 and E6 and the W-phase arm 38 includes switching elements E7 and E8. In addition, antiparallel diodes D3 to D8 are respectively connected to the switching elements E3 to E8. On/off states of the switching elements E3 to E8 are respectively controlled by switching control signals S3 to S8 from the control unit 26.

Midpoints of the phase arms 34 to 38 are respectively connected to corresponding phase coils of the alternating-current motor M1. That is, the alternating-current motor M1 is a three-phase synchronous permanent magnet motor. One ends of the three U, V and W-phase coils are connected in common to a neutral point 39, and the other end of each phase coil is connected to the midpoint of the switching elements of the corresponding one of the phase arms 34 to 38.

During step-up operation, the converter 20 supplies, to the inverters 221 and 222, direct-current voltage (the direct-current voltage corresponding to an input voltage to the inverters 221 and 222 is referred to as "system voltage VH") stepped up from the direct-current voltage supplied from the battery 11. More specifically, in response to the switching control signals S1 and S2 from the control unit 26, an on period during which the switching element E1 is turned on and an on period during which the switching element E2 is turned on are alternately provided, and a step-up ratio depends on the ratio of these on periods.

The converter 20 is able to step up the direct-current voltage of, for example, 300 V, supplied from the battery 11, to a step-up upper limit voltage of, for example, 650 V. However, the step-up upper limit voltage is not a fixed value but may be, for example, variable in accordance with a request from the vehicle, or the like. For example, a configuration may be employed, in which, when an economy mode is selected through driver's switch operation, an ECO signal is input to the control unit 26 and then the step-up upper limit value of the converter 20 is limited to, for example, 400 V.

In addition, during step-down operation, the converter 20 steps down the direct-current voltage, supplied from the inverter 221 via the smoothing capacitor 18, and charges the battery 11. More specifically, in response to the switching control signals S1 and S2 from the control unit 26, an on period during which only the switching element E1 is turned on and a period during which both the switching elements E1 and E2 are turned off are alternately provided, and a step-down ratio depends on the duty ratio of the on period.

The smoothing capacitor 18 has the function of smoothing the direct-current voltage from the converter 20 and supplying the smoothed direct-current voltage to the inverter 221. The voltage sensor 14 detects a voltage across the smoothing capacitor 18, that is, a system voltage VH, and outputs the detected value VH to the control unit 26.

In the case where a torque command value Tq* of the alternating-current motor M1 is positive (Tq*>0), when the direct-current voltage is supplied from the smoothing capacitor 18, the inverter 221 converts the direct-current voltage to alternating-current voltage through switching operations of the switching elements E3 to E8 according to the switching control signals S3 to S8 from the control unit 26 to drive the alternating-current motor M1 so that a positive torque is output. In addition, in the case where the torque command value Tq* of the alternating-current motor M1 is zero (Tq*=0), the inverter 221 converts the direct-current voltage to alternating-current voltage through switching operations according to the switching control signals S3 to S8 to drive the alternating-current motor M1 so that torque becomes zero. In this way, the alternating-current motor M1 is driven so as to generate a positive or zero torque specified by the torque command value Tq*.

In addition, during regenerative braking of the vehicle on which the motor control system 10 is mounted, the torque command value Tq* of the alternating-current motor M1 is set to a negative value (Tq*<0). In this case, the inverter 221 converts alternating-current voltage, generated by the alternating-current motor M1, to direct-current voltage through switching operations according to the switching control signals S3 to S8, and supplies the converted direct-current voltage to the converter 20 via the smoothing capacitor 18. Note that the regenerative braking includes braking with regenerative power generation in the case where a driver who drives a hybrid vehicle or an electric vehicle depresses a foot brake and releasing an accelerator pedal during travelling to decelerate (or stop accelerating) the vehicle while performing regenerative power generation although the foot brake is not operated.

A current sensor 24 detects a motor current flowing through the alternating-current motor M1, and outputs the detected motor current to the control unit 26. Note that because the sum of instantaneous values of three-phase currents iu, iv and iw is zero, as shown in FIG. 2, it suffices that the current sensor 24 is arranged so as to detect two-phase motor currents (for example, V-phase current iv and W-phase current iw).

A rotation angle sensor 40, such as a resolver, is provided for the alternating-current motor M1. The rotation angle sensor 40 detects a rotor rotation angle θ of the alternating-current motor M1, and transmits the detected rotation angle θ to the control unit 26. The control unit 26 calculates the rotation speed N1 and rotation velocity ω1 of the alternating-current motor M1 on the basis of the rotor rotation angle θ.

The control unit 26 generates the switching control signals S1 to S8 to control the operations of the converter 20 and inverter 221 so that the alternating-current motor M1 outputs a torque according to the torque command value Tq* by a method (described later) on the basis of the torque command value Tq* input from an externally provided electronic control unit (ECU), the battery voltage Vb detected by the voltage sensor 12, the system voltage VH detected by the voltage sensor 14, the motor currents iv and iw from the current sensor 24, and the rotation angle θ from the rotation angle sensor 40.

Note that, in the above description, the torque command value Tq* is input from the external ECU to the control unit 26; however, the configuration is not limited to this. For example, the control unit 26 may generate the torque command value Tq* on the basis of an input accelerator operation amount, vehicle speed, and the like, of the vehicle.

During step-up operation of the converter 20, the control unit 26 executes feedback control of the output voltage VH of the smoothing capacitor 18, and generates the switching control signals S1 and S2 such that the output voltage VH of the converter 20 becomes a system voltage command value VH*.

In addition, when the control unit 26 receives a signal, indicating that the vehicle enters a regenerative braking mode, from the external ECU, the control unit 26 generates the switching control signals S3 to S8 such that alternating-current voltage generated by the alternating-current motor M1 is converted to direct-current voltage, and outputs the switching control signals S3 to S8 to the inverter 221. In this way, the inverter 221 converts alternating-current voltage, generated by the alternating-current motor M1, to direct-current voltage, and supplies the direct-current voltage to the converter 20.

Furthermore, when the control unit 26 receives a signal, indicating that the vehicle enters the regenerative braking mode, from the external ECU, the control unit 26 generates the switching control signals S1 and S2 such that the direct-current voltage supplied from the inverter 221 is stepped down, and outputs the switching control signals S1 and S2 to the converter 20. In this way, the alternating-current voltage generated by the alternating-current motor M1 is converted to stepped-down direct-current voltage, and the battery 11 is charged with the stepped-down direct-current voltage.

Figure 3:
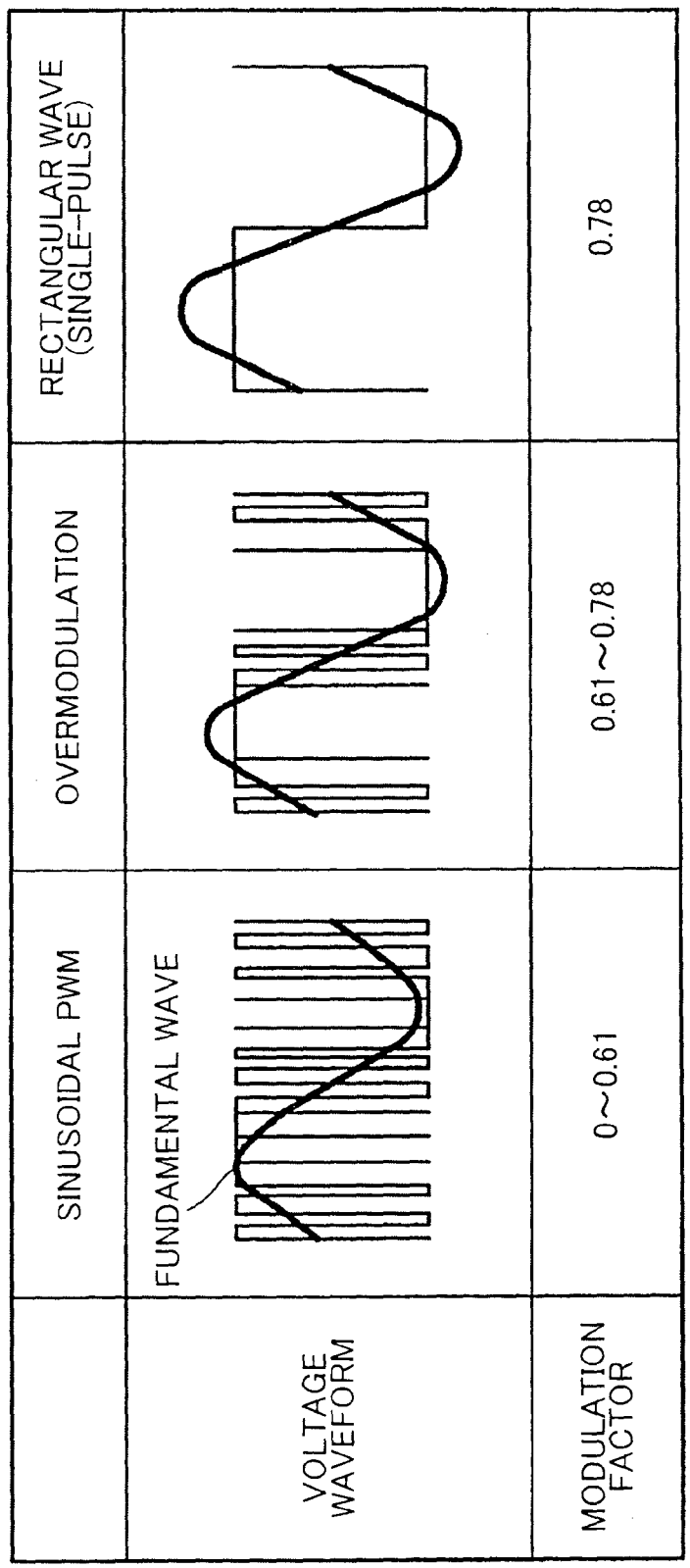
FIG. 3 is a diagram that shows a voltage waveform and a modulation factor in sinusoidal PWM control, overmodulation control and rectangular wave control.

Next, power conversion in the inverter 221, controlled by the control unit 26, will be described in detail. In the motor control system 10 according to the present embodiment, three control methods (control modes) shown in FIG. 3 are switched and used in power conversion in the inverter 221.

A sinusoidal PWM control method is generally used as PWM control, and on/off states of the switching elements in each phase arm are controlled in accordance with a comparison in voltage between a sinusoidal voltage command value and a carrier wave (typically, triangular wave). As a result, a duty ratio is controlled so that a fundamental wave component of a set of a high-level period corresponding to an on period of the upper arm element and a low-level period corresponding to an on period of the lower arm element becomes a sinusoidal alternating-current voltage (required motor voltage) within one control period. As is known, in a general sinusoidal PWM control method, it is possible to increase a modulation factor Kmd to 0.61. The modulation factor Kmd is defined as the ratio of the amplitude of a required motor voltage to a system voltage VH. However, in the case of sinusoidal PWM control in a two-phase modulation method or third-order harmonic superimposition control, it is known that the modulation factor Kmd is increased to 0.70.

On the other hand, in a rectangular wave control method, one rectangular-wave pulse, of which the ratio of the high-level period and the low-level period is 1 to 1, is applied to the alternating-current motor M1 within the one control period. In the rectangular wave control method, the amplitude of a fundamental wave component is fixed, so that torque control is executed through voltage phase control of a rectangular-wave pulse based on a deviation between a torque command value and an actual torque value obtained by computing electric power. In this way, the modulation factor Kmd is increased to 0.78.

An overmodulation control method, as well as the above-described sinusoidal PWM control method, is to execute PWM control in accordance with a comparison in voltage between a sinusoidal voltage command value and a carrier wave. However, in this case, a rectangular pulse having a relatively large duty ratio is generated in a range in which the voltage command value is larger than the carrier wave and, as a result, it is possible to expand the amplitude of a substantially sinusoidal fundamental wave component. Thus, it is possible to increase the modulation factor Kmd within the range of 0.61 to 0.78.

Figure 4:
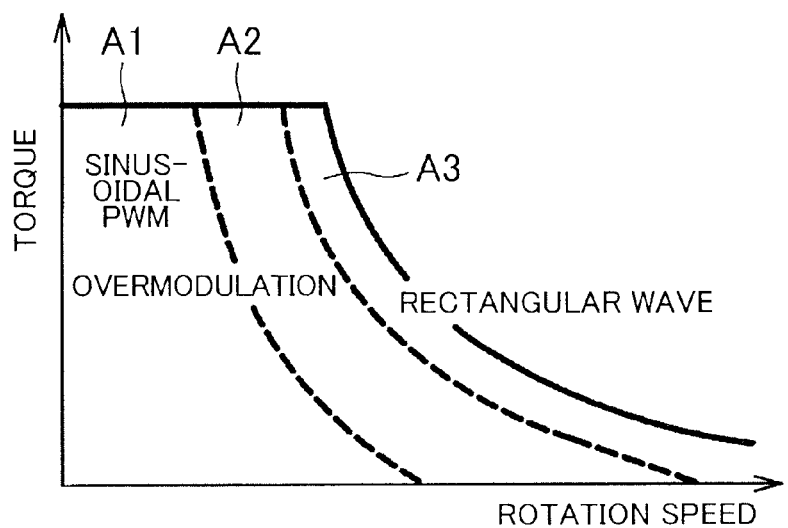
FIG. 4 is a diagram that shows a map that defines an operating condition of each motor by torque and rotation speed.

In the motor control system 10 according to the present embodiment, it is possible to drive the alternating-current motor M1 in any one of the above-described three control methods by supplying the battery voltage Vb to the inverter 221 as the system voltage VH without causing the converter 20 to perform step-up operation or stepping up the battery voltage Vb and supplying the stepped-up voltage to the inverter 221. FIG. 4 is a map that shows an application example of the above-described three control methods. In the map, the abscissa axis represents motor rotation speed, and the ordinate axis represents motor output torque. As shown in FIG. 4, sinusoidal PWM control is applied from a low rotation speed range to an intermediate rotation speed range, overmodulation control is applied from the intermediate rotation speed range to a high rotation speed range, and rectangular wave control is applied in a higher rotation speed range.

The control unit 26 selects the control method from among the three control methods in the following manner. Upon receiving the torque command value Tq* of the alternating-current motor M1 that is calculated by and input from the external ECU (not shown) from a required vehicle output based on an accelerator operation amount, or the like, the control unit 26 calculates the required motor voltage from the torque command value Tq* and motor rotation speed N of the alternating-current motor M1 on the basis of a preset map as shown in FIG. 4, or the like.

Then, the control unit 26 selects any one of field-weakening control (rectangular wave control method) and maximum torque control (sinusoidal PWM control method or overmodulation control method) for executing motor control in accordance with the correlation between a required motor voltage and a battery voltage Vb. During application of maximum torque control, one of the sinusoidal PWM control method and the overmodulation control method is selected depending on a modulation factor range of the voltage command value according to vector control. That is, sinusoidal PWM control is selected when 0<modulation factor≤0.61, and overmodulation control is selected when 0.61<modulation factor<0.78. In addition, rectangular wave control is selected when modulation factor≤0.78.

As described above, the modulation factor Kmd is constant at 0.78 in rectangular wave control, so that an output torque and a rotation speed that are obtained through rectangular wave control executed using the battery voltage Vb as the system voltage VH directly are limited. Therefore, when an output torque corresponding to a torque command value cannot be generated from the battery voltage Vb, the converter 20 is caused to start step-up operation to increase the system voltage VH. However, the converter 20 has a step-up upper limit value (or step-up maximum value) depending on the withstand voltage performance of each of the switching elements, and the like, that constitute the converter 20 and the inverter 221. Thus, when the system voltage VH reaches the step-up upper limit value, the rectangular wave control method in accordance with field-weakening control is applied while maintaining the state where the system voltage VH is the step-up upper limit value.

Figure 5:
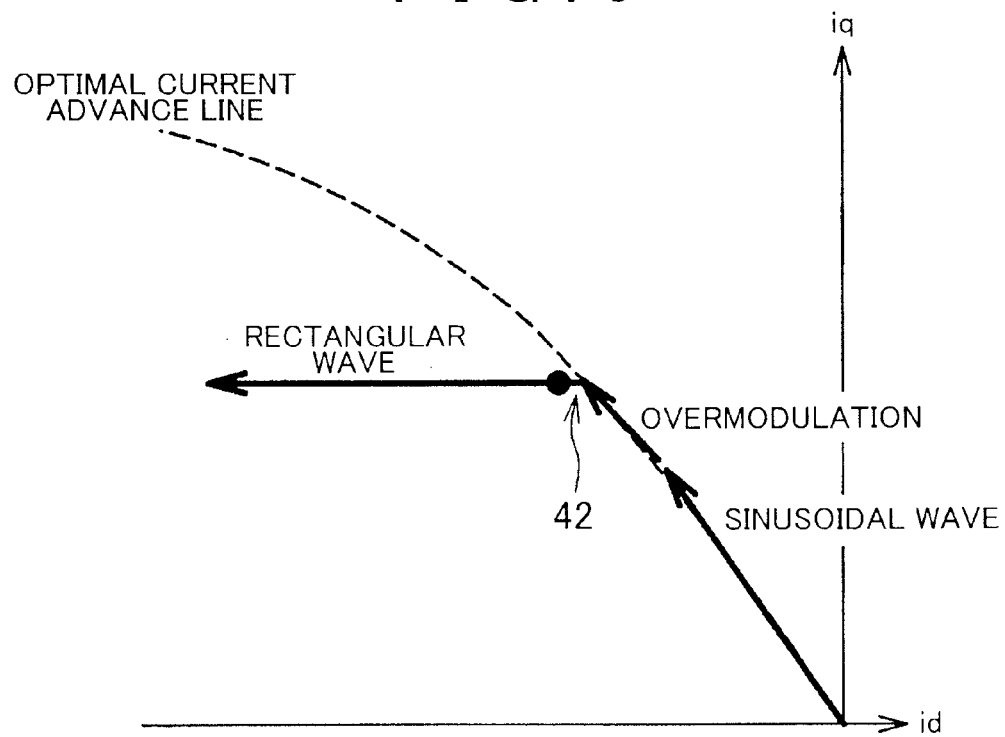
FIG. 5 is a graph that shows a current phase of motor current in sinusoidal PWM control, overmodulation control and rectangular wave control on a d-q coordinate plane.
Figure 6:
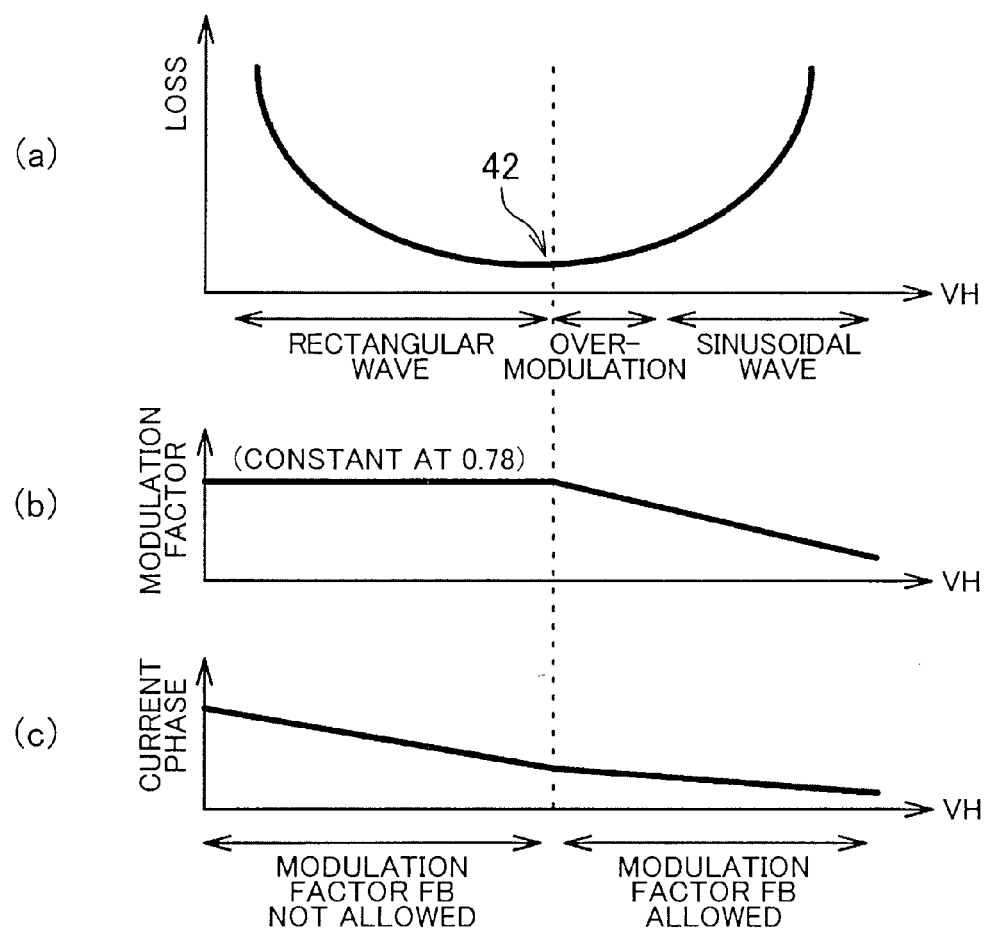
FIG. 6 shows graphs, in which (a) shows a correlation between a system voltage and a system loss in three control modes, (b) shows a correlation between a system voltage and a modulation factor in the three control modes, and (c) shows a correlation between a system voltage and a motor current phase in the three control modes.

FIG. 5 is a graph that shows a current phase of motor current in sinusoidal PWM control, overmodulation control, and rectangular wave control on a d-q coordinate plane. In the graph, the abscissa axis represents d-axis current id, and the ordinate axis represents q-axis current iq. Then, an optimal current advance line is indicated by broken line. The optimal current advance line is drawn by connecting points of optimal current phases (id, iq)opt at which a loss in the alternating-current motor M1 is minimum. The optimal current advance line may be obtained by an experiment, simulation, or the like, in advance, and stored. Note that, to be precise, the "current phase" is expressed as an angle formed by a current vector, the starting point of which is the intersection of the d axis (abscissa axis) and the q axis (ordinate axis), and the end point of which is the coordinate point (id, iq), with respect to the d axis or q axis; however, in the specification, for the sake of easy description, it is assumed that the end point of the current vector corresponds to a current phase.

As shown in FIG. 5, when the alternating-current motor M1 is driven in sinusoidal PWM control or overmodulation control, motor current is controlled by the inverter 221 so that the current phase of the motor current coincides with a current phase on the optimal current advance line. In contrast to this, in rectangular wave control, the absolute value of d-axis current id that is field current increases in order to execute field-weakening control, so that the end point, that is, the current phase, of the current vector that has a zero point as the starting point separates from the optimal current advance line leftward (or toward an advance side) in the graph, and a motor loss increases. This state will be described with reference to FIG. 6(a) to FIG. 6(c).

FIG. 6(a) is a graph that shows the correlation between a system voltage VH and a system loss in the three control modes. FIG. 6(b) is a graph that shows the correlation between a system voltage VH and a modulation factor Kmd in the three control modes. FIG. 6(c) is a graph that shows the correlation between a system voltage VH and a motor current phase in the three control modes.

Referring to FIG. 6(a), it is advantageous to operate the alternating-current motor M1 in rectangular wave control of so-called single-pulse control while decreasing a voltage stepped up by the converter 20, in order to reduce a switching loss in the converter 20 and the inverter 221 and to minimize a loss of the whole system. However, since rectangular wave control is voltage phase control under field-weakening control as described above, a motor loss increases with an increase in field-weakening current and, accordingly, a loss of the whole system also increases.

On the other hand, when the alternating-current motor M1 is operated in sinusoidal PWM control while increasing a voltage stepped up by the converter 20, a motor loss is reduced. However, due to a switching loss resulting from an increase in the number of switching operations, a loss in the converter and the inverter increases. Thus, a loss of the whole system that includes the alternating-current motor M1 is minimized when the current vector of motor current is on an optimal current advance line, at which maximum torque is output, or near the optimal current advance line during rectangular wave control. Hereinafter, such a current phase on the optimal current advance line or near the optimal current advance line is termed an optimal current phase (id, iq)opt. In addition, in FIG. 5 and FIG. 6(a), an operation point of the alternating-current motor M1 in rectangular wave control at the optimal current phase (id, iq)opt is indicated by the reference numeral 42.

When the operation of the alternating-current motor M1 is controlled through rectangular wave control while the motor current is the optimal current phase (id, iq)opt in this way, as shown in FIG. 6(b) and FIG. 6(c), the modulation factor Kmd in rectangular wave control is constant (0.78), so that it is impossible to optimally execute variable control of the system voltage VH by executing control by feedback of the modulation factor Kmd.

Thus, in the motor control system 10 according to the present embodiment, the control unit 26 corrects the system voltage command value VH* by executing control by feedback of the current phase (id, iq) of motor current flowing through the alternating-current motor M1. In this way, rectangular wave control with the optimal current phase (id, iq)opt is actively utilized. Next, correction control of the system voltage command value through control by feedback of the current phase in the control unit 26 will be described with reference to FIG. 7.

Figure 7:
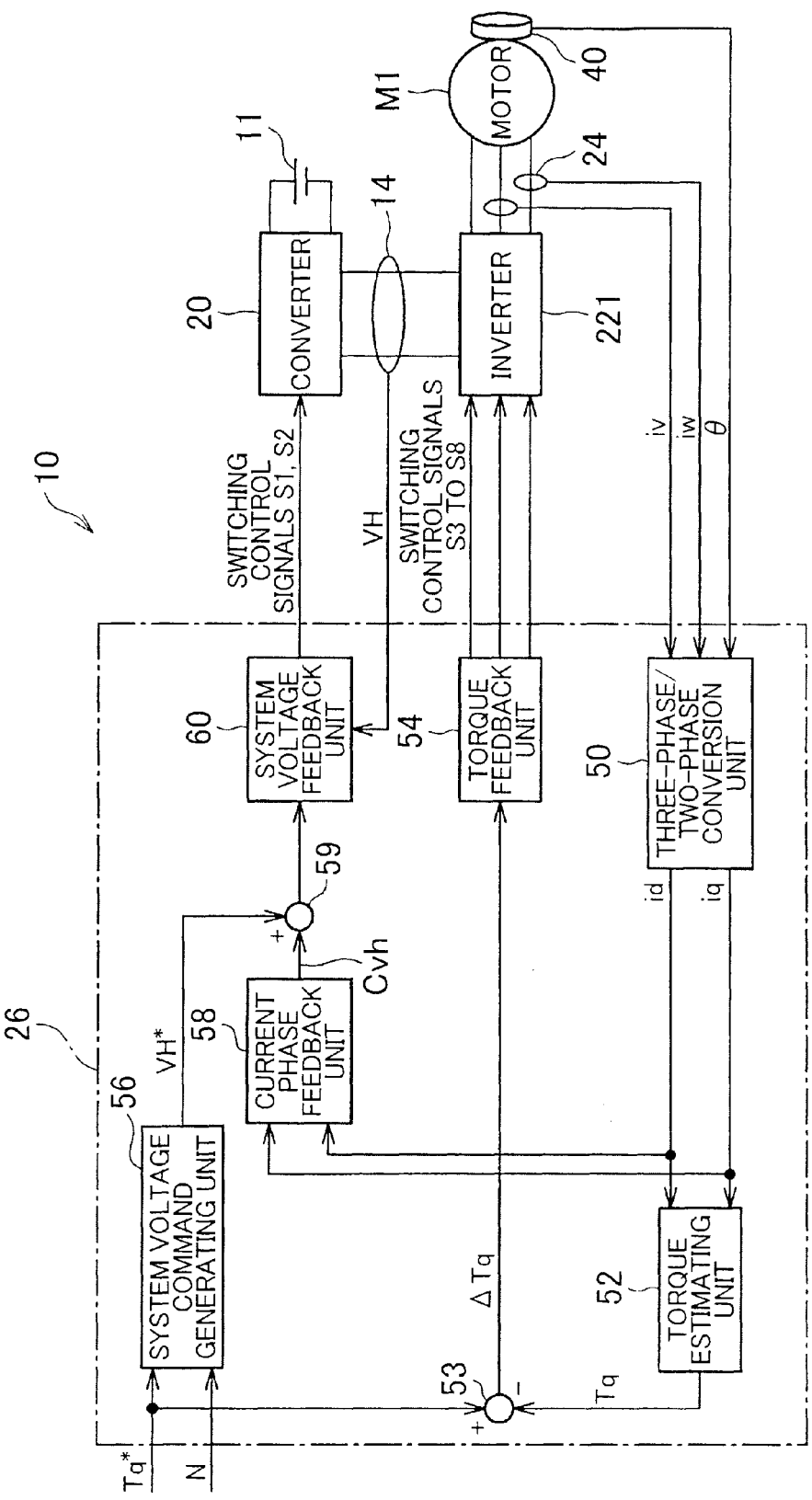
FIG. 7 is a block diagram that shows a control unit.

FIG. 7 is a block diagram that shows a control configuration related to rectangular wave control and current phase feedback control in the control unit 26. The control configuration shown in FIG. 7 is implemented through control processing in accordance with a predetermined program executed by the control unit 26. Instead, part or whole of the control configuration may be implemented by a hardware element.

The control unit 26 includes a three-phase/two-phase conversion unit 50, a torque estimating unit 52, a subtracting unit 53, a torque feedback unit 54, a system voltage command generating unit 56, a current phase feedback unit 58, and a system voltage feedback unit 60.

The three-phase/two-phase conversion unit 50 has the function of converting three-phase motor currents iu, iv and iw, flowing through the alternating-current motor M1, to two-phase d-axis and q-axis currents id and iq by coordinate conversion with the use of the rotor rotation angle θ and outputting the two-phase currents id and iq. Specifically, the U-phase current iu (=−(iv+iw)) is calculated from the V-phase current iv and the W-phase current iw that are detected by the current sensor 24, the d-axis current id and the q-axis current iq are generated on the basis of these iu, iv and iw by referring to the rotation angle θ detected by the rotation angle sensor 40, and the generated d-axis current id and q-axis current iq are output.

The torque estimating unit 52 has the correlation between a torque and a current, measured in advance, as a map, and refers to the map to derive an actual torque Tq on the basis of the d-axis current id and the q-axis current iq input from the three-phase/two-phase conversion unit 50.

The subtracting unit 53 compares the torque command Tq* input from the external ECU with the actual torque Tq derived as described above to generate a torque deviation ΔTq, and inputs the torque deviation ΔTq to the torque feedback unit 54.

The torque feedback unit 54 performs PI operation of the torque deviation ΔTq with the use of a predetermined proportional gain Gp and a predetermined integral gain Gi to obtain a control deviation, and sets a phase Φv of rectangular-wave voltage on the basis of the obtained control deviation. Specifically, in the case where a positive torque is generated (Tq>0), the voltage phase is advanced when the torque is insufficient, while the voltage phase is retarded when the torque is excessive; whereas, in the case where a negative torque is generated (Tq<0), the voltage phase is retarded when the torque is insufficient, while the voltage phase is advanced when the torque is excessive. Note that, in the present embodiment, proportional and integral control is executed in order to eliminate the torque deviation ΔTq; however, it is not limited to this configuration. Instead, proportional, integral and derivative control (PID control) may be executed.

Furthermore, the torque feedback unit 54 obtains two-phase voltage command values Vd* and Vq* in accordance with the voltage phase Φv, converts these two-phase voltage command values Vd* and Vq* to three-phase voltage command values (rectangular-wave pulses) Vu*, Vv* and Vw* through coordinate conversion (two phase to three phase) with the use of the rotation angle θ, and then generates the switching control signals S3 to S8 in accordance with these three-phase voltage command values Vu*, Vv* and Vw*. As a result, the inverter 221 performs switching operation in accordance with the switching control signals S3 to S8. In this way, the alternating-current voltages according to the voltage phase Φv are applied as the phase voltages Vu, Vv and Vw of the motor M1.

The system voltage command generating unit 56 refers to a preset table, map, or the like, to generate and output the generated system voltage command value VH* on the basis of the torque command value Tq* input from the external ECU and the motor rotation speed N calculated from the rotation angle θ.

Figure 8:
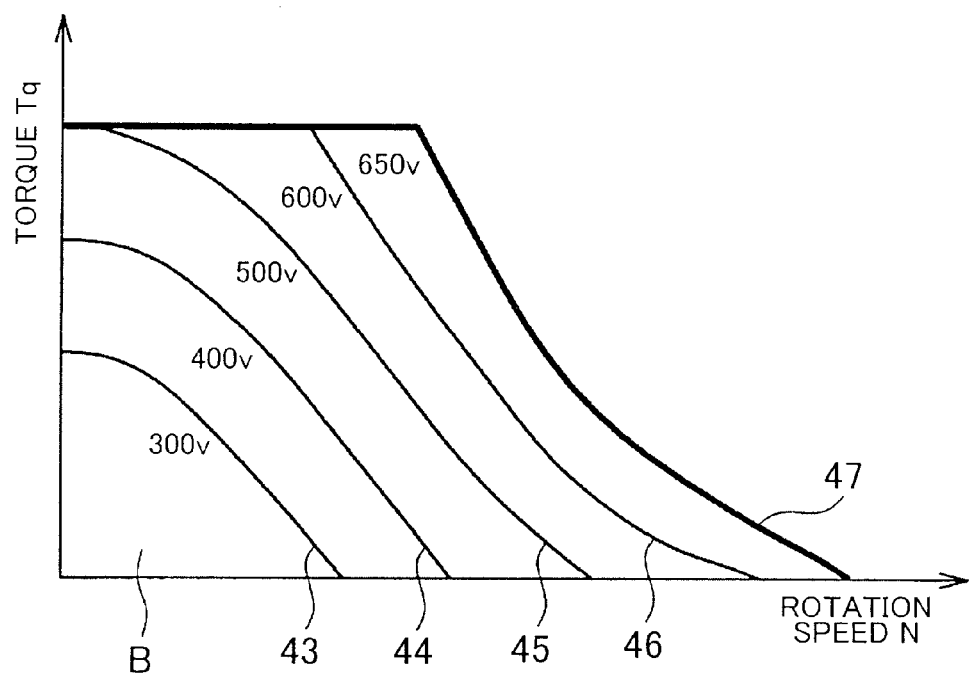
FIG. 8 is a diagram that shows a map referred to by a system voltage command generating unit in FIG. 7.

FIG. 8 shows an example of a map to be referred to when the system voltage command value VH* is obtained. In the map, as well as the map shown in FIG. 4, the abscissa axis represents motor rotation speed N, and the ordinate axis represents torque Tq. A motor operation region in the map is divided by four narrow solid lines 43 to 46 respectively corresponding to 300 V, 400 V, 500 V and 600 V that are typical system voltages VH, and a thick solid outline 47 located at the rightmost side in the graph corresponds to the maximum step-up voltage 650 V. Here, a substantially fan-shaped region B, divided by the line 43 of 300 V, is an operation region in which it is possible to drive the alternating-current motor M1 with the use of the battery voltage Vb as the system voltage VH without stepping up the battery voltage Vb. However, more specifically, step-up lines are defined in steps of a predetermined voltage (for example, 20 V) between the lines 43 to 47, and the system voltage command value VH* is set in steps of the predetermined voltage on the basis of an operation point specified by the torque command value Tq* and the rotation speed N.

Referring back to FIG. 7, the system voltage feedback unit 60 generates the switching control signals S1 and S2 so that the battery voltage Vb is stepped up to the input system voltage command value VH*, and outputs the switching control signals S1 and S2 to, the converter 20. The on/off states of the switching elements E1 and E2 are controlled upon receiving the control signals. In this way, the system voltage VH corresponding to the voltage command value VH* is supplied from the converter 20 to the inverter 221 via the smoothing capacitor 18.

The system voltage VH that is a voltage output from the converter 20 is detected by the voltage sensor 14, and is input to the system voltage feedback unit 60. In this way, a closed control loop is formed, and feedback control of the system voltage VH is executed. Specifically, a controlled operation amount (specifically, the duty ratios of the switching elements E1 and E2 of the converter 20) is, for example, subjected to PI operation for feedback control so that a deviation between the system voltage command value VH* and the system voltage VH detected by the voltage sensor 14 is eliminated.

The current phase feedback unit 58 has the function of receiving a current phase (id, iq) that is an actual motor current generated by the three-phase/two-phase conversion unit 50 and outputting a system voltage correction value Cvh in accordance with the received current phase (id, iq).

Figure 9:
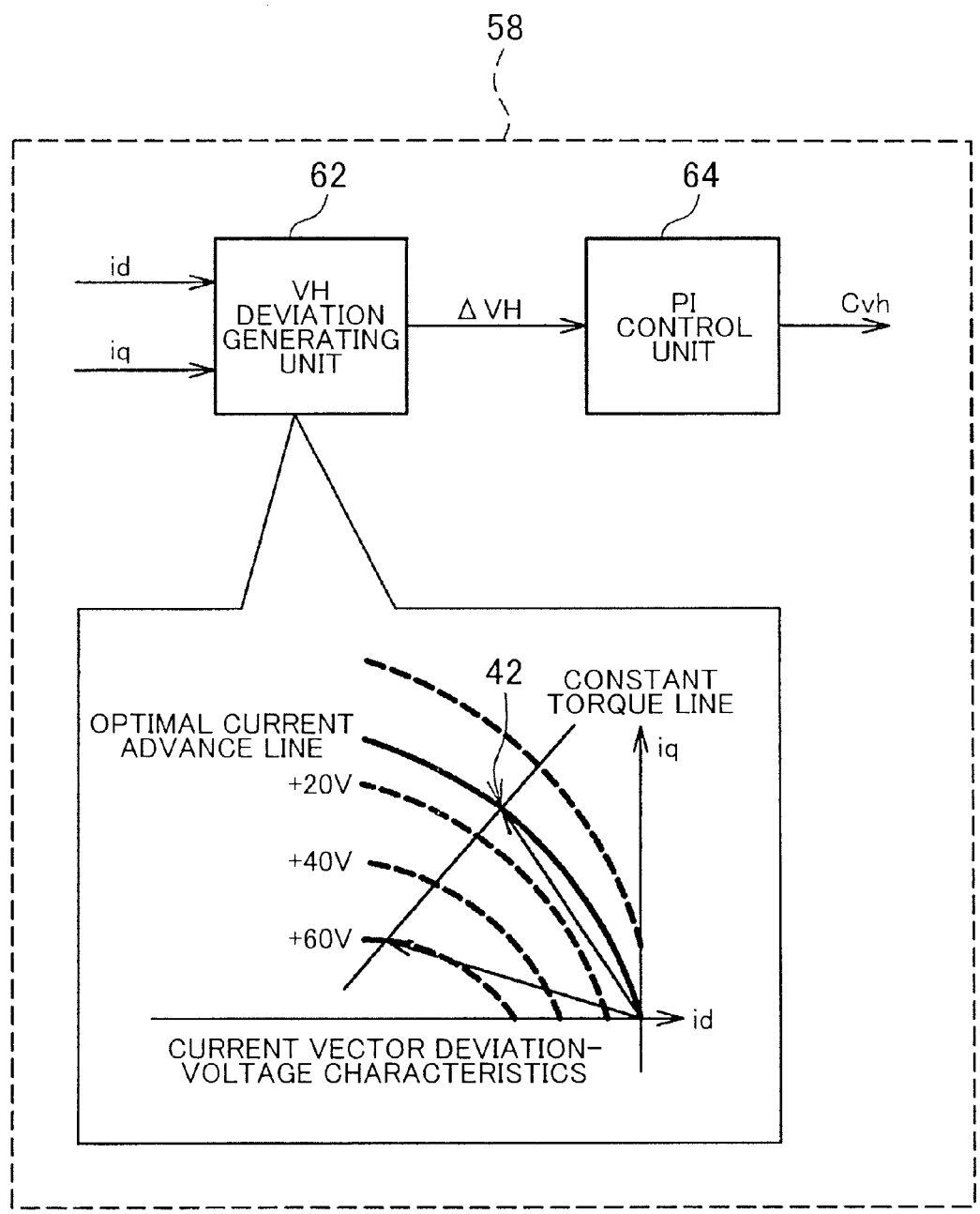
FIG. 9 is a block diagram that shows an example of a current phase feedback unit in FIG. 7.

Specifically, as shown in FIG. 9, the current phase feedback unit 58 includes a VH deviation generating unit 62 and a PI control unit 64.

The VH deviation generating unit 62 generates a system voltage deviation ΔVH required to change the current phase (id, iq) of motor current flowing through the alternating-current motor M1 to the optimal current phase (id, iq)opt without changing torque (that is, along a constant torque line). A map to be referred to for generating a system voltage deviation ΔVH is prestored in the control unit 26. FIG. 9 shows an example in which the system voltage deviation ΔVH required to change an actual current phase to the optimal current phase indicated by the reference numeral 42 is +60 volts.

Note that the system voltage deviation ΔVH is set to a negative value (that is, to step down the system voltage VH) when an actual current phase (id, iq) that is on the smaller angle side of the optimal current advance line is changed to the optimal current phase (id, iq)opt.

The PI control unit 64 executes proportional and integral control for eliminating the system voltage deviation ΔVH generated by the VH deviation generating unit 62. Specifically, the PI control unit 64 performs PI operation with the use of the predetermined proportional gain and the predetermined integral gain to obtain the system voltage correction value Cvh. Then, as shown in FIG. 7, the system voltage correction value Cvh is added to the system voltage command value VH*, generated by the system voltage command generating unit 56, in an adding unit 59. In this way, a corrected system voltage command value (VH*+Cvh) is generated. Such correction of the system voltage command value VH* is repeatedly executed in the closed control loop that includes the current phase feedback unit 58. In this way, it is possible to accurately and quickly shift into a state where the alternating-current motor M1 is controlled by rectangular wave control with the current phase (id, iq) being the optimal current phase (id, iq)opt.

Note that it is desirable that the correction value Cvh of the system voltage VH is not changed for a predetermined period of time after the control method for the alternating-current motor M1 is changed. In addition, a configuration may be employed, in which the system voltage VH is not corrected for a predetermined period of time after the converter 20 starts step-up operation. These are effective in preventing hunting of a change among the control modes.

Figure 10:
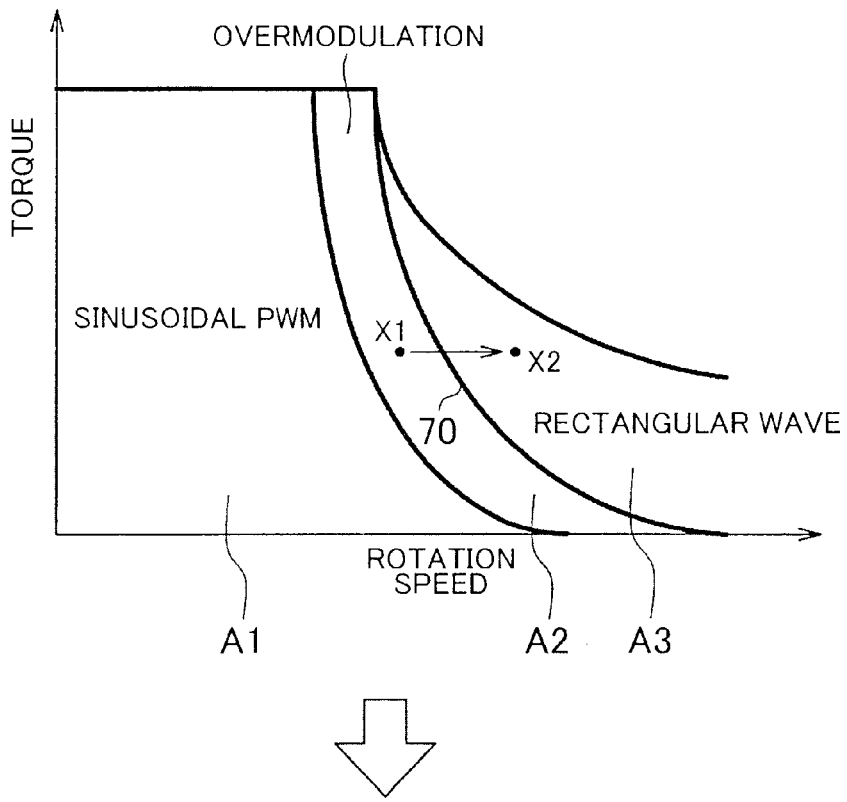
FIG. 10 is a graph that shows a state where a control method switching line is displaced through correction of a system voltage and that is similar to FIG. 4.
Figure 10:
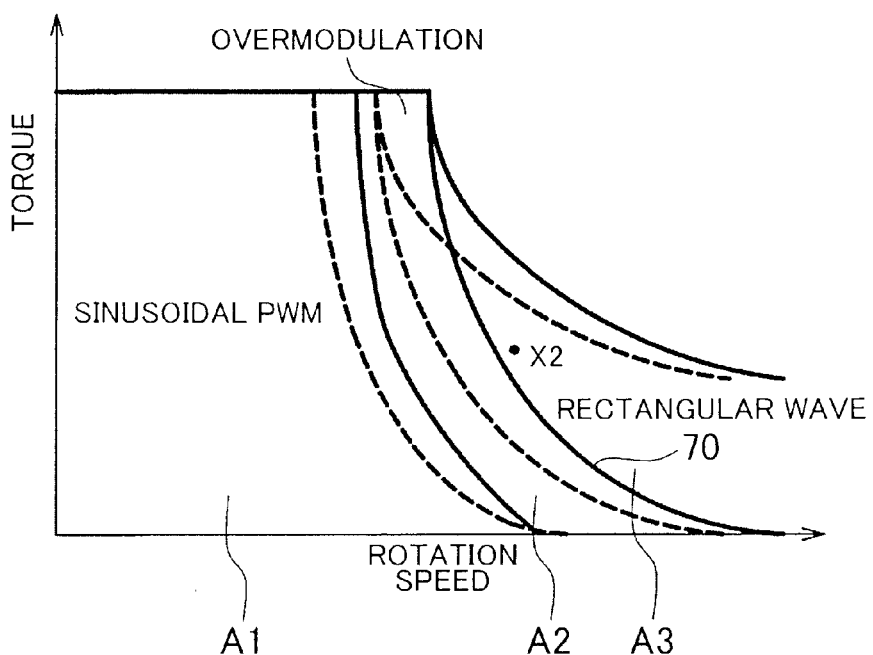

FIG. 10 shows a state where the system voltage VH is corrected as described above on a rotation speed-torque map. For example, as shown in the upper graph of FIG. 10, it is assumed that, in a state where the battery voltage Vb is directly supplied to the inverter 221 as the system voltage VH during non-step-up operation of the converter 20, a current operation point X1 of the alternating-current motor M1 in an overmodulation control region A2 significantly exceeds an overmodulation rectangular wave change line 70 and shifts into an operation point X2 in a rectangular wave control region A3. The changed operation point X2 is an operation point at which the alternating-current motor M1 is drivable through rectangular wave control, without step-up operation of the converter 20. Note that description will be made on an example in which the pre-change operation point X1 is an operation point within the overmodulation control region A2; however, the same applies to the case where the operation point X1 is in a sinusoidal PWM region A1.

In such a case, in the motor control system 10 according to the present embodiment, step-up operation of the converter 20 is started and, in this way, the system voltage VH is corrected as described above to a higher value, and, as shown in the lower graph of FIG. 10, the overmodulation rectangular wave change line 70 is shifted toward a higher rotation speed side (that is, rightward in the graph). In this way, the operation point X2 is located near the overmodulation rectangular wave change line 70 in the rectangular wave control region A3.

In contrast to this, when the converter 20 is in step-up operation and the operation point of the alternating-current motor M1 shifts from the rectangular wave control region A3 to the overmodulation region A2 or the sinusoidal PWM region A1 beyond the overmodulation rectangular wave change line 70, the system voltage VH is set so as to be low by correcting the system voltage VH as described above. That is, a voltage stepped-up by the converter 20 decreases. In this way, the overmodulation rectangular wave change line 70 shifts toward a low rotation speed side (that is, leftward in the graph), and the operation point is also located near the overmodulation rectangular wave change line 70 in the rectangular wave control region A3. Note that, in this case, when the corrected system voltage command value (VH*+Cvh) is lower than the battery voltage Vb, the converter 20 stops step-up operation, and overmodulation control or sinusoidal PWM control, which uses the battery voltage Vb as the system voltage VH, is executed.

By executing variable control of the system voltage VH through control by feedback of the current phase of motor current as described above, it is possible to drive the alternating-current motor M1 with the optimal current phase (id, iq)opt in rectangular wave control while suppressing a voltage stepped-up by the converter 20 to the extent possible. In this way, focusing on the alternating-current motor M1 in the motor control system 10, it is possible to effectively reduce or minimize a loss of the system that includes the converter 20, the inverter 221 and the alternating-current motor M1.

When variable control of the system voltage through current phase feedback control of motor current as described above is also applied to the alternating-current motor M2, a loss in the system that includes the converter 20, the inverter 222 and the alternating-current motor M2 is also reduced similarly.

However, when the above described variable control of the system voltage is applied in the motor control system 10 in which the two alternating-current motors M1 and M2 are connected to the one converter 20 via the respective inverters 221 and 222 in parallel with each other, the rotation speed and torque commands of the respective alternating-current motors M1 and M2 are usually different from each other and therefore, the system voltages VH at which losses of the individual alternating-current motors M1 and M2 are minimum are generally different from each other. Therefore, to execute variable control of the system voltage VH so as to minimize losses by feeding back the current phases of motor currents respectively flowing through the alternating-current motors M1 and M2, it is necessary to select any one of the alternating-current motors M1 and M2 and execute feedback control so that a loss of the selected motor is minimum.

In this case, unless selection of the motor and selection of a feedback control deviation are appropriately performed, respective feedback controls of the two motors M1 and M2 may interfere with each other, and, as a result, variable control of the system voltage VH may become unstable or the system voltage VH may become stepwise and smooth variable control may become unexecutable.

The motor control system 10 according to the present embodiment selects one of the motors that has the larger system voltage deviation obtained from the corresponding current vector, as a target to be subjected to feedback control. Next, the selecting control will be described.

Figure 11:
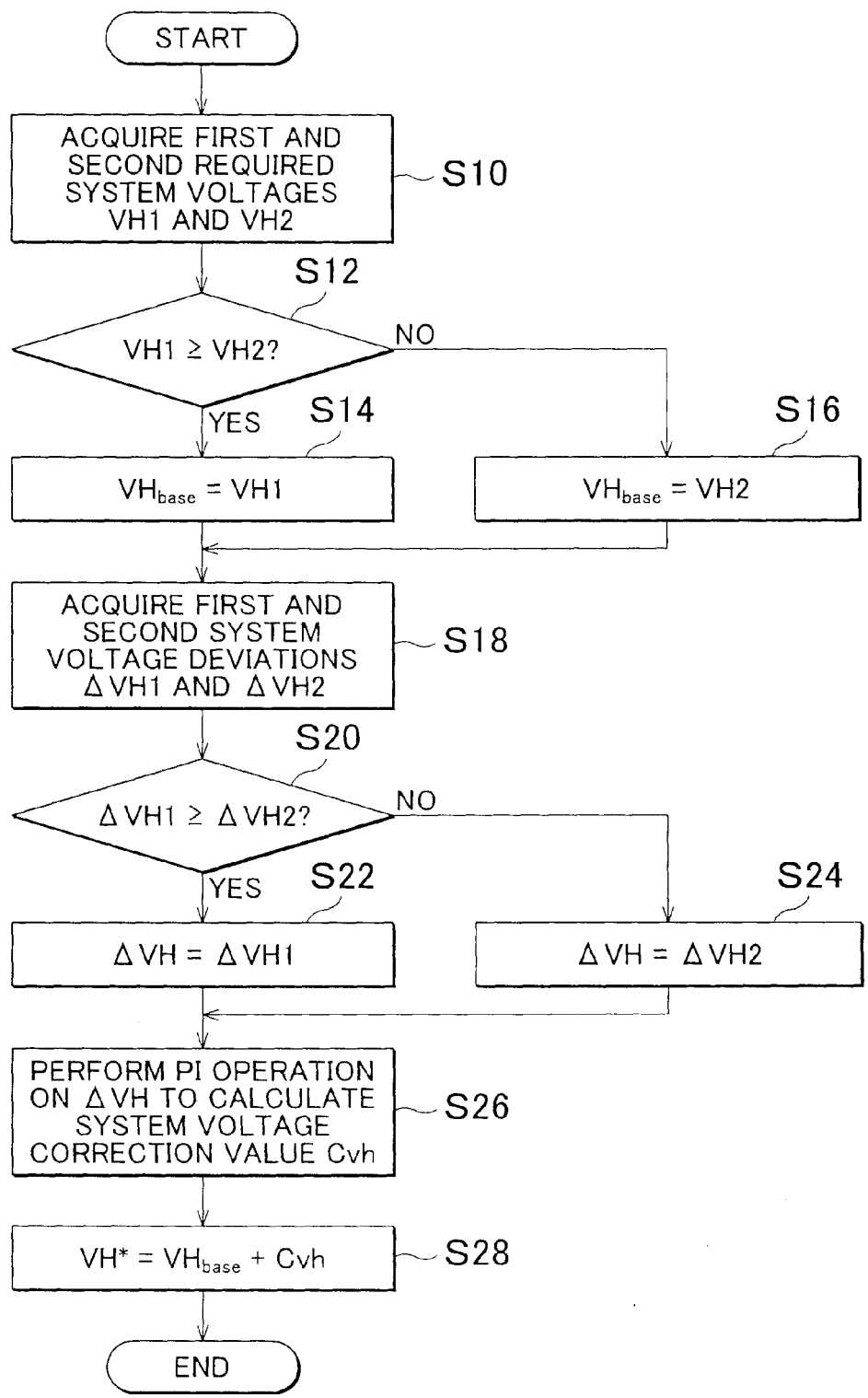
FIG. 11 is a flowchart that shows a procedure in which a system voltage command value is generated in the control unit through control by feedback of a current phase of motor current.

FIG. 11 is a flowchart that shows a procedure in which a system voltage command value is generated in the control unit 26 through control by feedback of the current phase of motor current.

First, the control unit 26 acquires first and second required system voltages VH1 and VH2 that are system voltages respectively required by the alternating-current motors M1 and M2 (step S10). The control unit 26 stores a first map and a second map as shown in FIG. 8, respectively corresponding to the alternating-current motors M1 and M2. The control unit 26 refers to the first map to obtain the first required system voltage VH1 on the basis of a torque command value Tq1* and a rotation speed N1 for the alternating-current motor M1, and refers to the second map to obtain the second required system voltage VH2 on the basis of a torque command value Tq2* and a rotation speed N2 for the alternating-current motor M2. Note that, when the alternating-current motors M1 and M2 are motors having the same specifications and conforming to the same standard, the first map and the second map may be the same.

Subsequently, the control unit 26 compares the first required system voltage VH1 with the second required system voltage VH2 (step S12), selects the larger value, and sets the larger value to a system voltage command base value VHbase. That is, when the first required system voltage VH1 is higher than or equal to the second required system voltage VH2 (YES in step S12), the first required system voltage VH1 is set to the system voltage command base value VHbase (step S14); otherwise (NO in step S12), the second required system voltage VH2 is set to the system voltage command base value VHbase (step S16). Note that, when VH1 is equal to VH2, the result is the same regardless of which one of VH1 and VH2 is set to the system voltage command base value and therefore, VH1 is selected here.

Subsequently, the control unit 26 acquires first and second system voltage deviations ΔVH1 and ΔVH2 (step S18). As described above with reference to FIG. 9, these first and second system voltage deviations ΔVH1 and ΔVH2 are acquired in the following manner. The VH deviation generating unit 62 of the current phase feedback unit 58 refers to different maps or a common map to obtain the first and second system voltage deviations ΔVH1 and ΔVH2 on the basis of id1, iq1 and id2, iq2 that are actual currents of the alternating-current motors M1 and M2, detected by the current sensors 24.

After that, the control unit 26 compares the first system voltage deviation ΔVH1 with the second system voltage deviation ΔVH2 (step S20), selects the larger value, and sets the larger value to the system voltage deviation ΔVH to be subjected to feedback control. That is, when the first system voltage deviation ΔVH1 is larger than or equal to the second system voltage deviation ΔVH2 (YES in step S20), the first system voltage deviation ΔVH1 is selected as the system voltage deviation ΔVH (step S22); otherwise (NO in step S20), the second system voltage deviation ΔVH2 is selected as the system voltage deviation ΔVH (step S24). Note that, when ΔVH1 is equal to ΔVH2, the result is the same regardless of which one of ΔVH1 and ΔVH2 is set to the system voltage deviation ΔVH and therefore, ΔVH1 is selected here.

Then, the control unit 26 executes proportional and integral control for eliminating the system voltage deviation ΔVH in the PI control unit 64 as described above to calculate the system voltage correction value Cvh (step S26), and adds the system voltage correction value Cvh to the above system voltage command base value to generate the system voltage command value VH* (step S28).

When the converter 20 performs step-up operation in accordance with the thus generated system voltage command value VH*, one of the alternating-current motors M1 and M2 that corresponds to the selected one of the system voltage deviations, is subjected to rectangular wave control with the optimal current phase, and the other one of the alternating-current motors M2 and M1 is subjected to overmodulation control or sinusoidal PWM control with the optimal current phase.

Note that, for example, on the condition that the alternating-current motors M1 and M2 are motors having the same specifications and the torque command values and the rotation speeds are substantially equal to each other, both the motors M1 and M2 can be subjected to rectangular wave control with the optimal current phase.

In the motor control system 10 according to the above-described present embodiment, the system voltage VH is controlled by feedback of a current phase of a current vector of motor current so that the rectangular wave control of one of the alternating-current motors M1 and M2 is performed in a state where the current phase is an optimal current phase, wherein the current phase of one of the motors that has a larger one of the system voltage deviations ΔVH1 and ΔVH2 respectively obtained from the current phases (iq, id) of current vectors, is selected as a subject of feedback. Therefore, feedback controls corresponding to the individual alternating-current motors M1 and M2 do not interfere with each other, and variable control of the system voltage VH does not become unstable. Here, the "interference between feedback controls" is, for example, the case where one feedback control result conflicts with the other feedback control result and then control becomes difficult, and, in the case of the above description, it is the case where ΔVH1 is +60 V and ΔVH2 is −20 V, or the like.

In addition, the larger one of the required system voltages is selected as the system voltage command base value and the system voltage command base value is corrected by the system voltage correction value obtained through current phase feedback control. In this way, even when a subsequently input or generated torque command value Tq* increases and it becomes necessary to step up the system voltage VH to a further larger value, it is possible to reduce a variation difference in the system voltage VH and to execute smooth variable control.

Next, a motor control system 80 that is another embodiment will be described with reference to FIG. 12 and FIG. 13. Here, the difference from the motor control system 10 will be mainly described, like reference numerals denote the same component elements, and redundant description is omitted.

Figure 12:
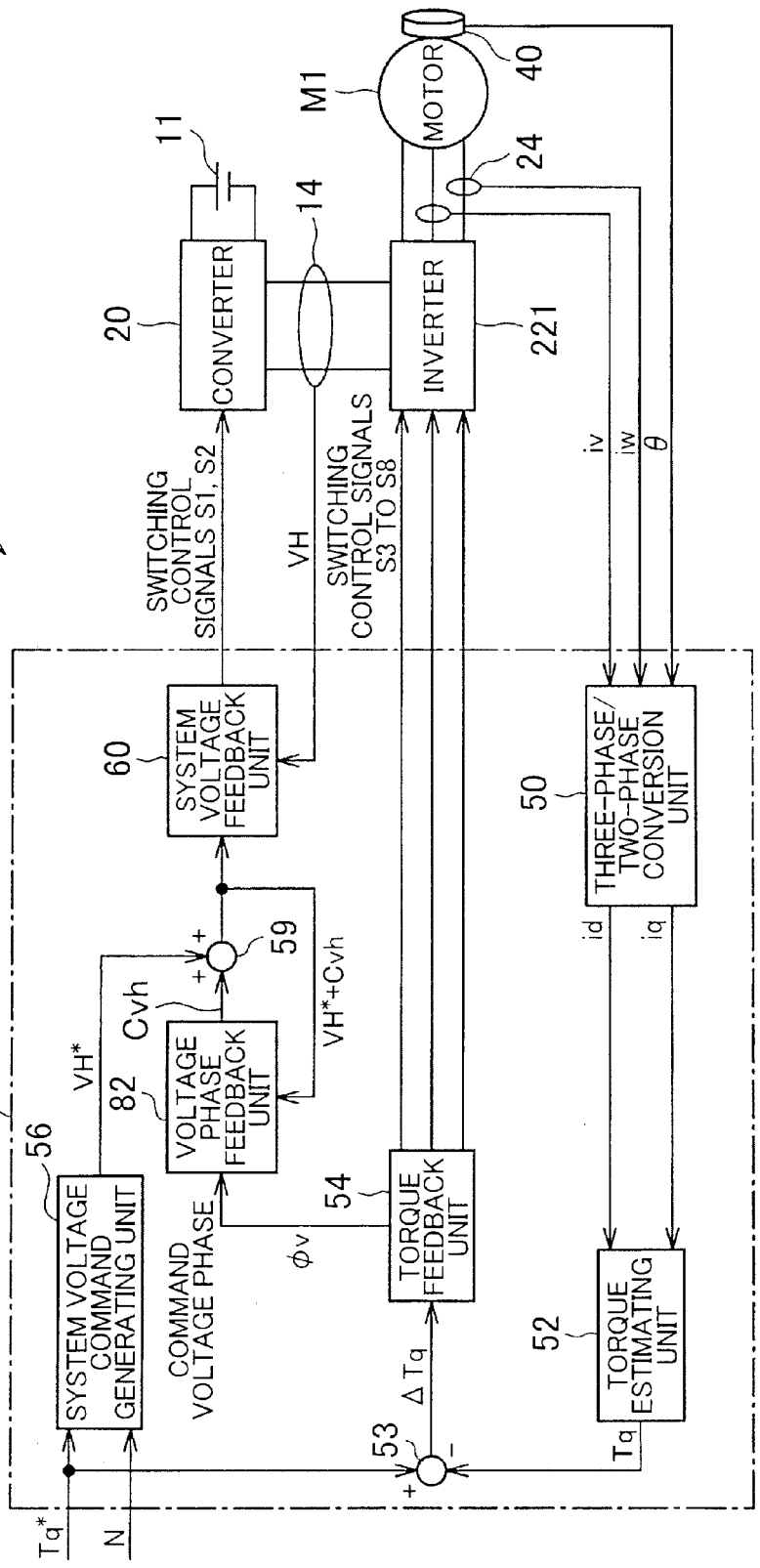
FIG. 12 is a block diagram that shows a control unit that includes a voltage phase feedback unit instead of a current phase feedback unit and that is similar to FIG. 7.

FIG. 12 is a block diagram that shows a control unit 26 that includes a voltage phase feedback unit 82 instead of the current phase feedback unit 58, and is similar to FIG. 7. FIG. 13 is a block diagram that shows an example of the voltage phase feedback unit 82 in FIG. 12. In the motor control system 80 according to the present embodiment, the control unit 26 includes the voltage phase feedback unit 82 instead of the current phase feedback unit 58 that executes control by feedback of the current phase of a current vector. The other configuration is the same as that of the motor control system 10.

As shown in FIG. 12, the voltage phase feedback unit 82 has the function of receiving a command voltage phase Φv input from the torque feedback unit 54 of a rectangular wave control block, generating a system voltage correction value Cvh on the basis of the command voltage phase Φv, and outputting the system voltage correction value Cvh to the adding unit 59. A system voltage command value VH* (accurately, "VH*+Cvh") corrected by addition of the system voltage correction value Cvh (described later) is input to the voltage phase feedback unit 82.

Figure 13:
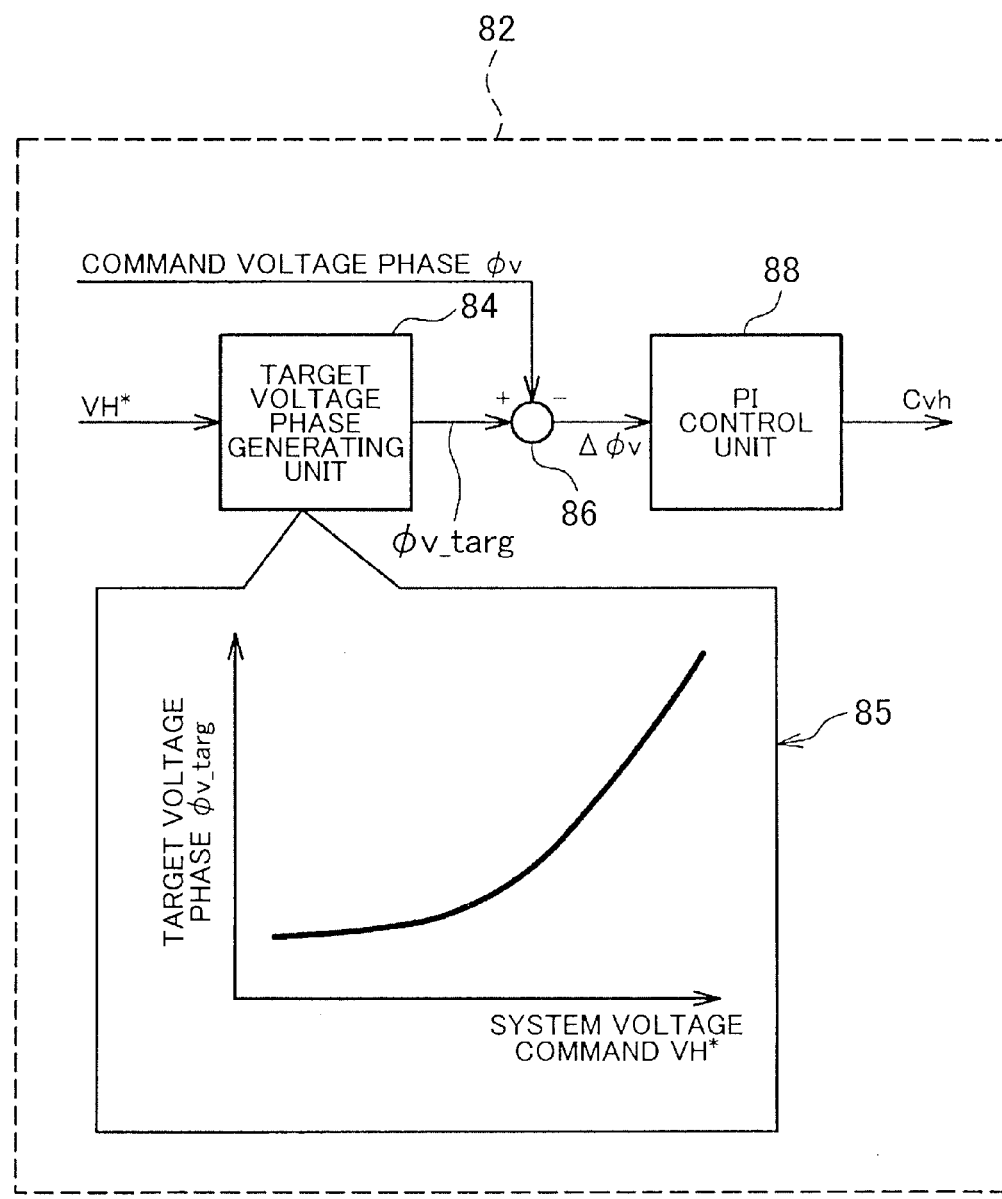
FIG. 13 is a block diagram that shows an example of the voltage phase feedback unit in FIG. 12.

More specifically, as shown in FIG. 13, the voltage phase feedback unit 82 includes a target voltage phase generating unit 84, a subtracting unit 86 and a PI control unit 88.

In the target voltage phase generating unit 84, a map 85 that defines the correlation between a corrected system voltage command value VH* and a target voltage phase Φv_targ is prestored in a read-only-memory (ROM), or the like, and a target voltage phase Φv_targ is derived from the map 85 on the basis of the input system voltage command value VH*. Here, the "target voltage phase Φv_targ" is a voltage phase of rectangular-wave pulse required to change the current phase (id, iq) of motor current flowing through the alternating-current motor M1 to the above optimal current phase (id, iq)opt without changing torque (that is, along a constant torque line).

The target voltage phase Φv_targ output from the target voltage phase generating unit 84 is compared with or subtracted from the command voltage phase Φv in the subtracting unit 86. In this way, a voltage phase deviation ΔΦv is generated. Then, the voltage phase deviation ΔΦv is input to the PI control unit 88.

The PI control unit 88 executes proportional and integral control for eliminating the above voltage phase deviation ΔΦv. Specifically, the PI control unit 88 performs PI operation with the use of a predetermined proportional gain and a predetermined integral gain to obtain a control deviation, specifically, a system voltage correction value Cvh, and then adds the system voltage correction value Cvh to the system voltage command value VH* generated by the system voltage command generating unit 56 in the adding unit 59, thereby generating a corrected system voltage command value (VH*+Cvh).

Such correction of the system voltage command value VH* is repeatedly executed in the closed control loop that includes the voltage phase feedback unit 82. In this way, it is possible to accurately and quickly shift into a state where the alternating-current motor M1 is controlled by rectangular wave control with the current phase (id, iq) being the optimal current phase (id, iq)opt.

The motor control system 80 according to the present embodiment also makes it possible to operate the alternating-current motor M1 with the optimal current phase (id, iq)opt in rectangular wave control while suppressing a voltage stepped-up by the converter 20 to the extent possible, by executing control by feedback of voltage phase of a rectangular-wave pulse. Thus, it is possible to effectively reduce or minimize a loss of the system that includes the converter 20, the inverter 221 and the alternating-current motor M1. In addition, when such variable control of the system voltage VH is also applied to the alternating-current motor M2, a loss in the system that includes the converter 20, the inverter 222 and the alternating-current motor M2 is also reduced similarly. However, in the present embodiment as well, in order to execute stable feedback control and smooth variable control of the system voltage, the process for selecting a system voltage deviation to be subjected to feedback control is executed as follows.

Figure 14:
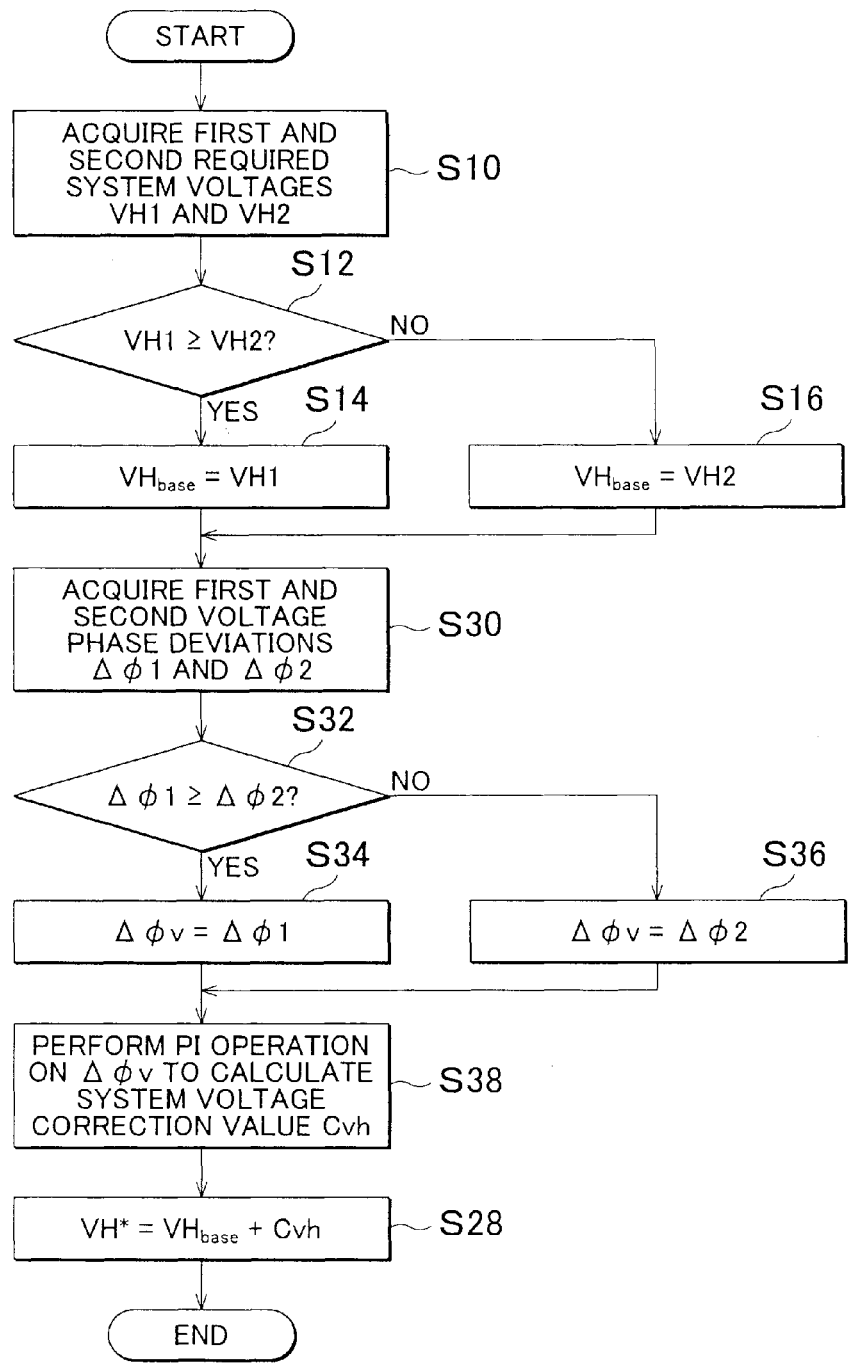
FIG. 14 is a flowchart that shows a procedure by which a system voltage command value is generated in the control unit through control by feedback of a voltage phase of alternating-current voltage applied to an alternating-current motor.

FIG. 14 is a flowchart that shows a procedure in which a system voltage command value VH* is generated in the control unit 26 through control by feedback of a voltage phase. Steps S10 to S16 and S28 among the steps shown in FIG. 14 are similar to those of FIG. 11 and therefore, the description thereof is omitted.

After the system voltage command base value VHbase is set in step S14 and step S16, the control unit 26 obtains first and second voltage phase deviations $\Delta\Phi1$ and $\Delta\Phi2$ (step S30). As described above with reference to FIG. 13, these first and second voltage phase deviations $\Delta\Phi1$ and $\Delta\Phi2$ each are obtained for the motor M1 or M2 as a difference between the target voltage phase $\Phi v\_targ$ derived by referring to the map in the voltage phase feedback unit 82 and an actual voltage phase $\Phi v$ input from the torque feedback unit 54.

Subsequently, the control unit 26 compares the first voltage phase deviation $\Delta\Phi1$ with the second voltage phase deviation $\Delta\Phi2$ (step S32), selects the larger value, and sets the larger value to the voltage phase deviation $\Delta\Phi v$ to be the subject of feedback. That is, when the first voltage phase deviation $\Delta\Phi1$ is larger than or equal to the second voltage phase deviation $\Delta\Phi2$ (YES in step S32), the first voltage phase deviation $\Delta\Phi1$ is selected as the voltage phase deviation $\Delta\Phi v$ (step S34); otherwise (NO in step S32), the second voltage phase deviation $\Delta\Phi2$ is selected as the voltage phase deviation $\Delta\Phi v$ (step S36). Note that, when $\Delta\Phi1$ is equal to $\Delta\Phi2$, the result is the same regardless of which one of $\Delta\Phi1$ and $\Delta\Phi2$ is set to the voltage phase deviation $\Delta\Phi v$ and therefore, $\Delta\Phi1$ is selected here.

Then, the control unit 26 calculates a system voltage correction value Cvh for eliminating the above voltage phase deviation $\Delta\Phi v$ in the PI control unit 88 as described above (step S38), and adds the system voltage correction value Cvh to the above system voltage command base value to generate the system voltage command value VH* (step S28).

When the converter 20 performs step-up operation in accordance with the thus generated system voltage command value VH*, one of the alternating-current motors M1 and M2 that corresponds to the selected one of the voltage phase deviations, is subjected to rectangular wave control with the optimal current phase, and the other one of the alternating-current motors M2 and M1 is subjected to overmodulation control or sinusoidal PWM control with the optimal current phase.

With the motor control system 80 according to the present embodiment as well, feedback controls respectively corresponding to the alternating-current motors M1 and M2 do not interfere with each other to make variable control of the system voltage VH unstable, and it is possible to execute smooth variable control of the system voltage VH.

Note that the motor control system according to the invention is not limited to the above described configurations of the embodiments and alternative embodiments, and various modifications and improvements can be made within the matter described in the scope of the appended claims.

The invention claimed is:

1. A motor control system comprising:
   a converter that is configured to be able to step up a direct-current voltage, supplied from a power supply, in accordance with a system voltage command value;
   first and second inverters, each of which is configured to convert a direct-current voltage, which is a system voltage output from the converter, to an alternating-current voltage;
   first and second motors that are driven by the alternating-current voltages respectively applied from the first and second inverters; and
   a control unit that is configured to be able to drive the first and second motors in any one of control methods of sinusoidal PWM control, overmodulation control and rectangular wave control by executing operation control of the converter and the first and second inverters according to an input or generated torque command value, wherein
   the control unit that controls the converter and the first and second inverters, the control unit is configured to control the system voltage by feedback of a current phase of a current vector of motor current of each of the first and second motors on a d-q coordinate plane so that the rectangular wave control of at least one of the first and second motors is performed in a state where the current phase is an optimal current phase at which a loss in a motor is minimum, wherein the control unit selects, as a subject of the feedback, the current phase of one of the first and second motors that is larger than the other motor in system voltage deviation obtained based on the current vector, and
   the control unit is further configured to compare first and second required system voltage values respectively required by the first and second motors to select one of the first and second required system voltage values as a system voltage command base value and add a system voltage correction value obtained through the feedback of the current phase, to the system voltage command base value to generate the system voltage command value used by the converter.

2. The motor control system according to claim 1, wherein:
   the control unit stores a first map and a second map that each define correlations among motor rotation speed, torque, and required system voltage values for the first and second motors, respectively;
   the control unit is configured to refer to the first map to obtain a first required system voltage value on the basis of a torque command value, and a rotation speed for the first motor; and
   the control unit is configured to refer to the second map to obtain a second required system voltage value on the basis of a torque command value and a rotation speed for the second motor.

3. The motor control system according to claim 2, wherein the control unit is configured to compare the first and second required system voltage values to select one of the first and second required system voltage values as a system voltage command base value and add a system voltage correction value obtained through the feedback of the current phase, to the system voltage command base value to generate the system voltage command value.

4. The motor control system according to claim 3, wherein the control unit is configured to select one of the first and second required system voltage values that is larger than the other of the first and second required system voltage values, as the system voltage command base value.

5. The motor control system according to claim 1, wherein the control unit is configured to select one of the first and second required system voltage values that is larger than the other of the first and second required system voltage values, as the system voltage command base value.

6. A motor control system comprising:
a converter that is configured to be able to step up a direct-current voltage, supplied from a power supply, in accordance with a system voltage command value;
first and second inverters, each of which is configured to convert a direct-current voltage, which is a system voltage output from the converter, to an alternating-current voltage;
first and second motors that are driven by the alternating-current voltages respectively applied from the first and second inverters; and
a control unit that controls the converter and the first and second inverters, the control unit is configured to be able to drive the first and second motors in any one of control methods of sinusoidal PWM control, overmodulation control and rectangular wave control by executing operation control of the converter and the first and second inverters according to an input or generated torque command value, wherein
the control unit is configured to control the system voltage by feedback of a voltage phase of each of first and second motor voltages respectively applied to the first and second motors so that the rectangular wave control of at least one of the first and second motors is performed in a state where a current vector of motor current on a d-q coordinate plane is an optimal current phase at which a loss in a motor is minimum, wherein
the control unit selects, as a subject of the feedback, the voltage phase of one of the first and second motors that is larger than the other motor in system voltage deviation obtained based on the current vector, and
the control unit is further configured to compare first and second required system voltage values respectively required by the first and second motors to select one of the first and second required system voltage values as a system voltage command base value and add a system voltage correction value obtained through the feedback of the current phase, to the system voltage command base value to generate the system voltage command value used by the converter.

7. The motor control system according to claim 6, wherein
the control unit is configured to compare first and second required system voltage values respectively required by the first and second motors to select one of the first and second required system voltage values as a system voltage command base value and add a system voltage correction value obtained through the feedback of the voltage phase, to the system voltage command base value to generate the system voltage command value.

8. The motor control system according to claim 7, wherein
the control unit is configured to select one of the first and second required system voltage values that is larger than the other of the first and second required system voltage values, as the system voltage command base value.

9. The motor control system according to claim 6, wherein:
the control unit stores a first map and a second map that each define correlations among motor rotation speed, torque, and required system voltage values for the first and second motors, respectively;
the control unit is configured to refer to the first map to obtain a first required system voltage value on the basis of a torque command value, and a rotation speed for the first motor; and
the control unit is configured to refer to the second map to obtain a second required system voltage value on the basis of a torque command value and a rotation speed for the second motor.

10. The motor control system according to claim 9, wherein
the control unit is configured to compare the first and second required system voltage values to select one of the first and second required system voltage values as a system voltage command base value and add a system voltage correction value obtained through the feedback of the voltage phase, to the system voltage command base value to generate the system voltage command value.

11. The motor control system according to claim 10, wherein
the control unit is configured to select one of the first and second required system voltage values that is larger than the other of the first and second required system voltage values, as the system voltage command base value.

* * * * *